(12) United States Patent
Shiraga

(10) Patent No.: US 11,461,060 B2
(45) Date of Patent: Oct. 4, 2022

(54) COMPUTER-READABLE MEDIUM, INFORMATION PROCESSING DEVICE, COMMUNICATION SYSTEM, AND METHOD FOR MANAGING HOW DETERIORATED A MEMBER IS IN EACH PRINTER INCLUDED IN THE SYSTEM

(71) Applicant: BROTHER KOGYO KABUSHIKI KAISHA, Nagoya (JP)

(72) Inventor: Naoto Shiraga, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/891,526

(22) Filed: Jun. 3, 2020

(65) Prior Publication Data
US 2020/0379694 A1 Dec. 3, 2020

(30) Foreign Application Priority Data
Jun. 3, 2019 (JP) .............................. JP2019-103968

(51) Int. Cl.
*G06F 15/00* (2006.01)
*G06F 3/12* (2006.01)

(52) U.S. Cl.
CPC .......... *G06F 3/1231* (2013.01); *G06F 3/1208* (2013.01); *G06F 3/1256* (2013.01); *G06F 3/1287* (2013.01)

(58) Field of Classification Search
CPC .... G06F 3/1231; G06F 3/1208; G06F 3/1256; G06F 3/1287

USPC ....................................................... 358/1.14
See application file for complete search history.

(56) References Cited

U.S. PATENT DOCUMENTS

| 6,430,711 | B1* | 8/2002 | Sekizawa ............ G06F 11/3006 |
| | | | 358/1.14 |
| 10,402,295 | B1* | 9/2019 | Beiriger .............. G06F 11/3013 |
| 2006/0242030 | A1* | 10/2006 | Blanchard .......... G06Q 30/0633 |
| | | | 705/14.51 |

(Continued)

FOREIGN PATENT DOCUMENTS

| JP | 2017-536598 A | 12/2017 |
| WO | WO 2016/048417 A1 | 3/2016 |

*Primary Examiner* — Mark R Milia
(74) *Attorney, Agent, or Firm* — Scully, Scott, Murphy & Presser, P.C.

(57) ABSTRACT

A non-transitory computer-readable medium stores computer-readable program instructions executable by a processor connected with an information processing device including a communication interface. The program instructions are configured to, when executed by the processor, cause the processor to receive status information transmitted by a printer, via the communication interface, the status information including usage information regarding use of a particular member that deteriorates with use of the printer, generate notification information based on the usage information included in the received status information, the notification information including at least one of information representing that the particular member needs to be replaced or maintained and information representing that the printer needs to be replaced, and transmit the generated notification information to a device other than the printer via the communication interface.

16 Claims, 13 Drawing Sheets

(56) References Cited

U.S. PATENT DOCUMENTS

| | | | |
|---|---|---|---|
| 2011/0216348 A1* | 9/2011 | Kanada | G06K 15/02 358/1.14 |
| 2013/0026837 A1* | 1/2013 | Nozawa | H02J 7/35 307/66 |
| 2015/0306868 A1* | 10/2015 | Ohhashi | B41J 29/38 347/5 |
| 2017/0310845 A1* | 10/2017 | Miura | H04N 1/00832 |
| 2018/0032297 A1* | 2/2018 | She | G06F 3/1204 |
| 2018/0267428 A1* | 9/2018 | Kawajiri | G03G 15/556 |

* cited by examiner

FIG. 3

MANAGEMENT DATABASE

| Serial Number | Model Name | Internal Identification Number | Battery Information ||| Head Information |||| Number of Cutter Uses | Print Settings || ... | Update Date |
|---|---|---|---|---|---|---|---|---|---|---|---|---|---|---|
| | | | Battery Life (5 Levels) | Number of 80% Charges | Number of 100% Charges | Head Life (5 Levels) | Number of Recordings | Recording Length | | | Recording Density | ... | | |
| 12345 | A001 | ABCD | 1 | 210 | 86 | 3 | 650 | 260m | 419 | 4 | ... | ... | 2019.04.01 |
| 23456 | A001 | ABCD | 5 | 5 | 2 | 5 | 150 | 62m | 120 | 4 | ... | ... | 2019.05.13 |
| 34567 | A001 | ABCD | 3 | 57 | 150 | 4 | 415 | 150m | 268 | 4 | ... | ... | 2019.05.14 |
| 45678 | A002 | ABCD | — | 196 | 105 | — | 502 | 205m | 419 | 4 | ... | ... | 2019.05.14 |
| 56789 | A002 | EFGH | — | 45 | 60 | — | 471 | 187m | 65 | 3 | ... | ... | 2019.05.13 |
| 67890 | A002 | EFGH | — | 96 | 120 | — | 587 | 235m | 268 | 3 | ... | ... | 2019.05.14 |
| 78901 | A003 | JKLM | — | — | 14 | — | 140 | — | 101 | 5 | ... | ... | 2019.05.14 |
| 89012 | A003 | JKLM | — | — | 12 | — | 115 | — | 69 | 5 | ... | ... | 2019.05.14 |
| 90123 | A003 | JKLM | — | — | 85 | — | 603 | — | 611 | 5 | ... | ... | 2019.05.14 |
| ... | ... | ... | ... | ... | ... | ... | ... | ... | ... | ... | ... | ... | ... |

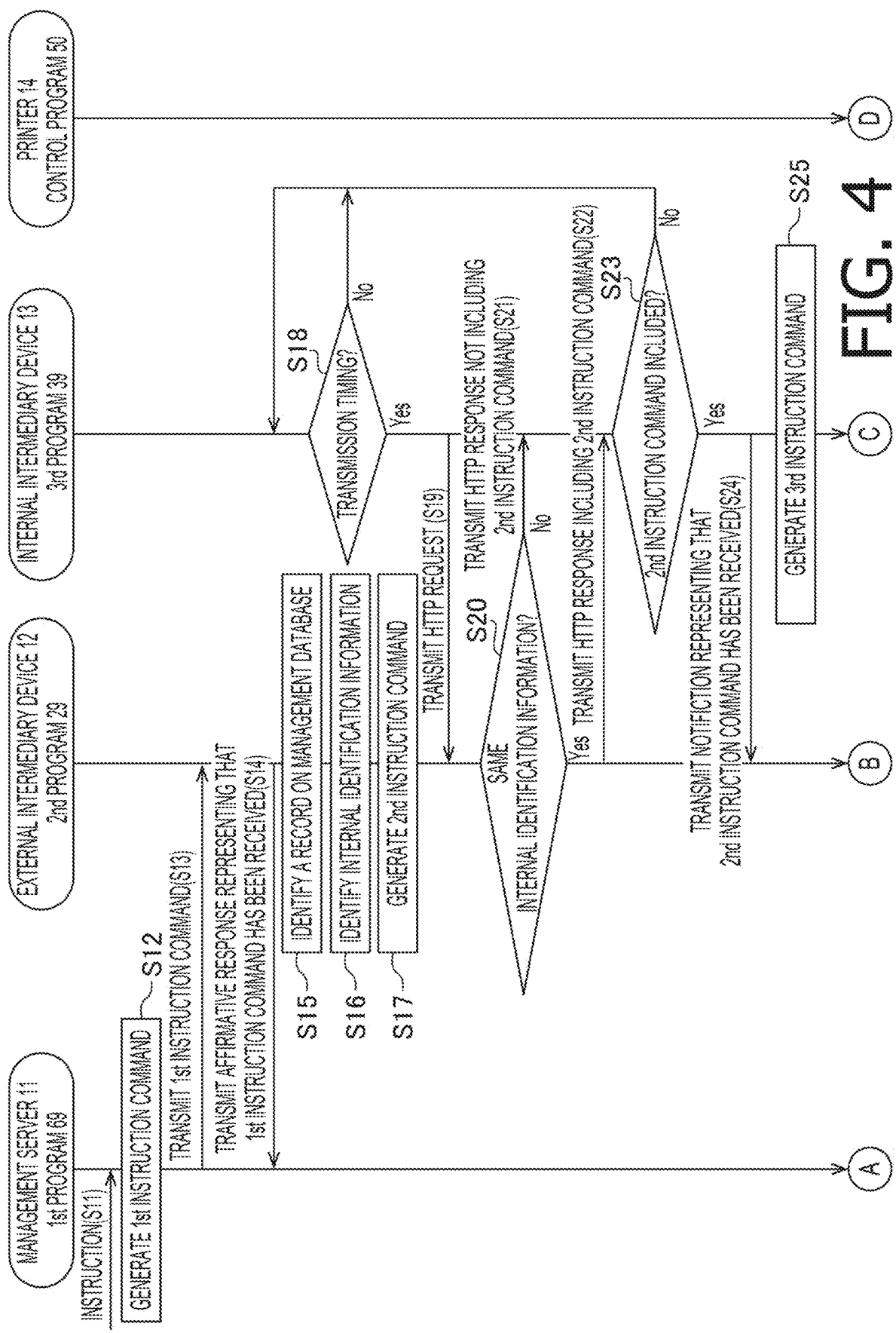

1st SCREEN

| Serial Number | Model Name | Branch Name | Battery Information | | | Head Information | | | Number of Cutter Uses | Print Setting |
|---|---|---|---|---|---|---|---|---|---|---|
| | | | Battery Life (5 Levels) | Number of 80% Charges | Number of 100% Charges | Head Life (5 Levels) | Number of Recordings | Recording Length | | Recording Density |
| 12345 | A001 | BRANCH A | 1 | 210 | 2 | 3 | 650 | 260m | 419 | 3 |
| 23456 | A001 | BRANCH A | 5 | 5 | 150 | 5 | 150 | 62m | 120 | 3 |
| 34567 | A001 | BRANCH A | 3 | 57 | 105 | 4 | 415 | 150m | 268 | 3 |
| 45678 | A002 | BRANCH A | — | 196 | 60 | — | 502 | 205m | 419 | 4 |
| 56789 | A002 | BRANCH B | — | 45 | 14 | — | 471 | 187m | 65 | 3 |
| 67890 | A002 | BRANCH B | — | 96 | 8 | — | 587 | 235m | 268 | 3 |
| 78901 | A003 | BRANCH C | — | — | 14 | — | 140 | — | 101 | 5 |
| 89012 | A003 | BRANCH C | — | — | 12 | — | 115 | — | 69 | 5 |
| 90123 | A003 | BRANCH C | — | — | 85 | — | 603 | — | 611 | 5 |

FIG. 9A

2nd SCREEN

| Serial Number | Model Name | Branch Name | Battery Life (5 Levels) |
|---|---|---|---|
| 12345 | A001 | BRANCH A | 1 |
| 45678 | A002 | BRANCH A | 1 |
| 78901 | A003 | BRANCH C | 1 |
| 89012 | A003 | BRANCH C | 1 |

The batteries need to be replaced.

FIG. 9B

| Serial Number | Model Name | Branch Name | Battery Information | | | Head Information | | | Number of Cutter Uses | Print Settings |
|---|---|---|---|---|---|---|---|---|---|---|
| | | | Battery Life (5 Levels) | Number of 80% Charges | Number of 100% Charges | Head Life (5 Levels) | Number of Recordings | Recording Length | | Recording Density |
| 12345 | A001 | BRANCH A | 1 | 210 | 2 | 3 | 650 | 260m | 419 | 3 |
| 23456 | A001 | BRANCH A | 5 | 5 | 150 | 5 | 150 | 62m | 120 | 3 |
| 34567 | A001 | BRANCH A | 3 | 57 | 105 | 4 | 415 | 150m | 268 | 3 |
| 45678 | A002 | BRANCH A | 5 | 196 | 60 | — | 502 | 205m | 419 | 4 |
| 56789 | A002 | BRANCH B | 4 | 45 | 14 | — | 471 | 187m | 65 | 3 |
| 67890 | A002 | BRANCH B | 3 | 96 | 8 | — | 587 | 235m | 268 | 3 |
| 78901 | A003 | BRANCH C | 2 | — | 14 | — | 140 | — | 101 | 5 |
| 89012 | A003 | BRANCH C | 3 | — | 12 | — | 115 | — | 69 | 5 |
| 90123 | A003 | BRANCH C | 4 | — | 85 | — | 603 | — | 611 | 5 |

3rd SCREEN

FIG. 9C

COMPUTER-READABLE MEDIUM, INFORMATION PROCESSING DEVICE, COMMUNICATION SYSTEM, AND METHOD FOR MANAGING HOW DETERIORATED A MEMBER IS IN EACH PRINTER INCLUDED IN THE SYSTEM

CROSS-REFERENCE TO RELATED APPLICATION

This application claims priority under 35 U.S.C. § 119 from Japanese Patent Application No. 2019-103968 filed on Jun. 3, 2019. The entire subject matter of the application is incorporated herein by reference.

BACKGROUND

Technical Field

Aspects of the present disclosure are related to a non-transitory computer-readable medium, an information processing device, a communication system, and a method for managing how deteriorated a member is in each printer included in the communication system.

Related Art

An MDM ("MDM" is an abbreviation of "Mobile Device Management") system has been known in which a management server on the Internet communicates with mobile devices to manage the mobile devices. The mobile devices may include, but are not limited to, mobile phones, tablet computers, notebook personal computers, and printers.

An administrator of the mobile devices accesses the management server from a terminal device (e.g., a personal computer and a tablet computer) to manage statuses of the mobile devices and provide an instruction to the mobile devices.

SUMMARY

The aforementioned known system does not disclose sufficient information on a technique for managing how deteriorated a member is in each printer included in the system.

Aspects of the present disclosure are advantageous to provide one or more improved techniques that make it possible to manage how deteriorated a member is in each printer.

According to aspects of the present disclosure, a non-transitory computer-readable medium is provided, which stores computer-readable program instructions executable by a processor connected with an information processing device including a communication interface. The program instructions are configured to, when executed by the processor, cause the processor to receive status information transmitted by a printer, via the communication interface, the status information including usage information regarding use of a particular member that deteriorates with use of the printer, generate notification information based on the usage information included in the received status information, the notification information including at least one of information representing that the particular member needs to be replaced or maintained and information representing that the printer needs to be replaced, and transmit the generated notification information to a device other than the printer via the communication interface.

According to aspects of the present disclosure, further provided is a non-transitory computer-readable medium storing computer-readable program instructions executable by a processor of a first intermediary device of a communication system. The communication system includes the first intermediary device and a second intermediary device. The program instructions are configured to, when executed by the processor, cause the processor to receive an HTTP request including status information of a printer, from the second intermediary device via a communication interface of the first intermediary device, the status information including usage information regarding use of a particular member that deteriorates with use of the printer, generate notification information based on the usage information included in the received status information, the notification information including at least one of information representing that the particular member needs to be replaced or maintained and information representing that the printer needs to be replaced, and transmit the generated notification information to a device other than the printer via the communication interface.

According to aspects of the present disclosure, further provided is a non-transitory computer-readable medium storing computer-readable program instructions executable by a processor of a second intermediary device of a communication system. The communication system includes a first intermediary device and the second intermediary device. The program instructions are configured to, when executed by the processor, cause the processor to transmit a request for transmission of status information to a printer via a communication interface of the second intermediary device, the status information including usage information regarding use of a particular member that deteriorates with use of the printer, receive the status information transmitted by the printer, via the communication interface, transmit an HTTP request including the received status information to the first intermediary device via the communication interface, generate notification information based on the usage information included in the received status information, the notification information including at least one of information representing that the particular member needs to be replaced or maintained and information representing that the printer needs to be replaced, and output the generated notification information.

According to aspects of the present disclosure, further provided is an information processing device including a communication interface and a controller. The controller is configured to receive status information transmitted by a printer, via the communication interface, the status information including usage information regarding use of a particular member that deteriorates with use of the printer, generate notification information based on the usage information included in the received status information, the notification information including at least one of information representing that the particular member needs to be replaced or maintained and information representing that the printer needs to be replaced, and transmit the generated notification information to a device other than the printer via the communication interface.

According to aspects of the present disclosure, further provided is a communication system including a management server and an intermediary device. The management server includes a first communication interface and a first controller. The intermediary device includes a second communication interface and a second controller. The second controller is configured to transmit a request for transmission of status information to a printer via the second communication interface, the status information including usage information regarding use of a particular member that deteriorates with use of the printer, receive the status information transmitted by the printer, via the second communication interface, and transmit the received status information to the management server via the second communication interface. The first controller is configured to receive the status information via the first communication interface, generate notification information based on the usage information included in the received status information, the notification information including at least one of information representing that the particular member needs to be replaced or maintained and information representing that the printer needs to be replaced, and transmit the generated notification information to a device other than the printer via the first communication interface.

According to aspects of the present disclosure, further provided is a communication system including a management server and at least one intermediary device. The at least one intermediary device includes at least one communication interface and at least one controller. The at least one controller is configured to transmit a request for transmission of status information to a printer via the at least one communication interface, the status information including usage information regarding use of a particular member that deteriorates with use of the printer, receive the status information transmitted by the printer, via the at least one communication interface, generate notification information based on the usage information included in the received status information, the notification information including at least one of information representing that the particular member needs to be replaced or maintained and information representing that the printer needs to be replaced, and transmit the generated notification information to the management server via the at least one communication interface.

According to aspects of the present disclosure, further provided is a method implementable on a processor connected with an information processing device including a communication interface. The method includes receiving status information transmitted by a printer, via the communication interface, the status information including usage information regarding use of a particular member that deteriorates with use of the printer, generating notification information based on the usage information included in the received status information, the notification information including at least one of information representing that the particular member needs to be replaced or maintained and information representing that the printer needs to be replaced, and outputting the generated notification information.

BRIEF DESCRIPTION OF THE ACCOMPANYING DRAWINGS

FIG. 3 shows an example of a management database in the illustrative embodiment according to one or more aspects of the present disclosure.

FIGS. 4 and 5 show a sequence of processes to be performed by the management server, an external intermediary device, each internal intermediary device, and each printer when a setting value is set for each specified printer, in the illustrative embodiment according to one or more aspects of the present disclosure.

FIG. 9A shows an example of a first screen displayed on a display of the administrator terminal, in the illustrative embodiment according to one or more aspects of the present disclosure.

FIG. 9B shows an example of a second screen displayed on the display of the administrator terminal, in the illustrative embodiment according to one or more aspects of the present disclosure.

FIG. 9C shows an example of a third screen displayed on the display of the administrator terminal, in the illustrative embodiment according to one or more aspects of the present disclosure.

DETAILED DESCRIPTION

Figure 1:
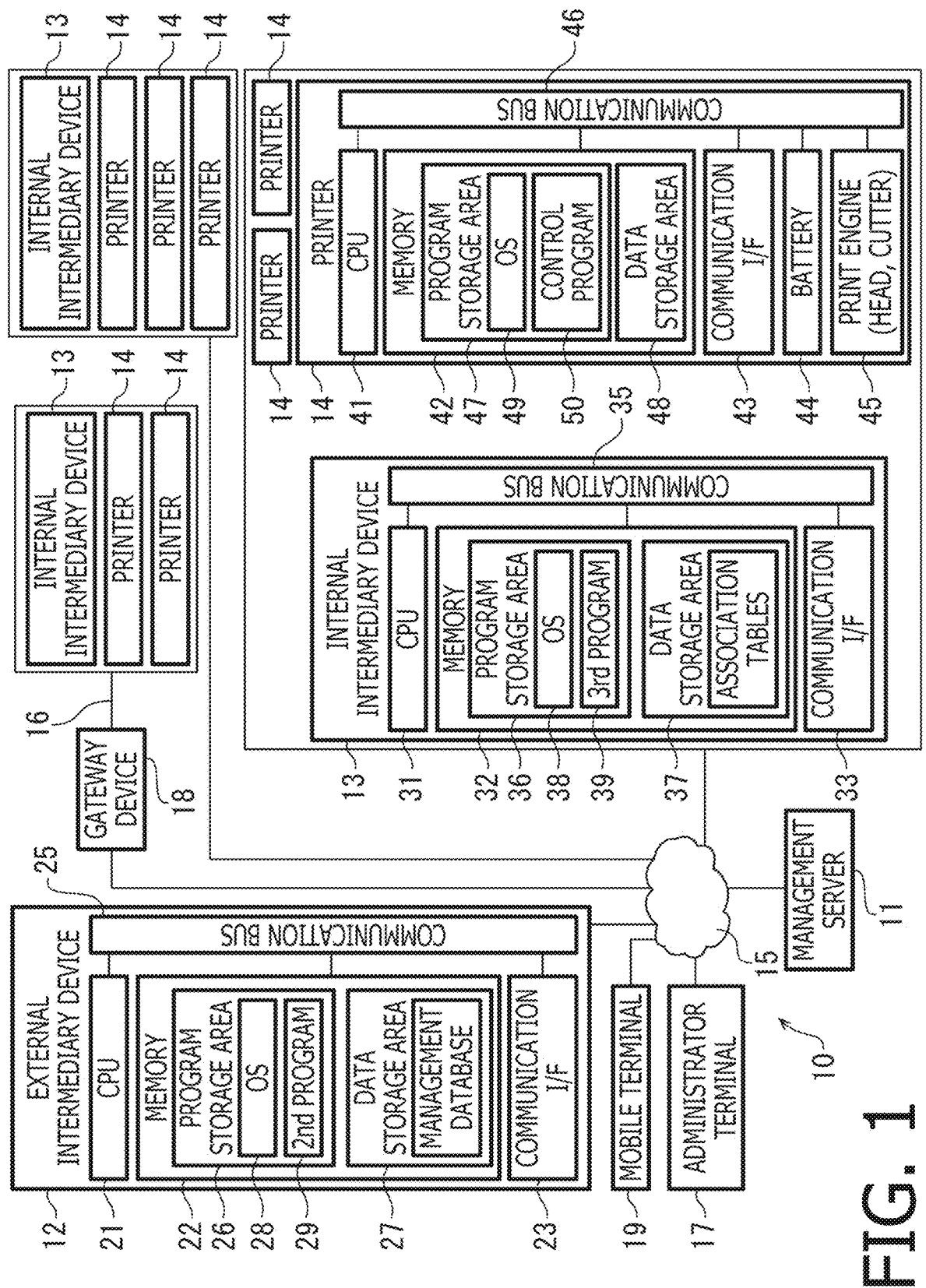
FIG. 1 is a block diagram schematically showing a configuration of a communication system in an illustrative embodiment according to one or more aspects of the present disclosure.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

In the illustrative embodiment, an example will be described in which a communication system 10 (see FIG. 1) provides a business operator with a service for managing one or more printers 14 used in each of a plurality of branches of the business operator.

The communication system 10 uses an MDM system that provides the business operator with a service for managing mobile devices (e.g., a mobile terminal 19 and mobile printers). Specifically, the communication system 10 uses a management server 11 that manages the mobile devices communicable with other devices via an Internet 15. The communication system 10 includes an external intermediary device 12 and one or more internal intermediary devices 13 as well as the management server 11 in such a manner that the management server 11 is allowed to manage the one or more printers 14. As will be described in detail later, each printer 14 is a mobile device not having a configuration for communicating with other devices via the Internet 15. In other words, each printer 14 is a mobile device that is unable to be managed by the management server 11 alone. The communication system 10 includes the external intermediary device 12 and the one or more internal intermediary devices 13. Thus, the communication system 10 is enabled to manage the one or more printers 14.

First, an explanation will be provided of connection of the management server 11, the external intermediary device 12, the one or more internal intermediary device 13, and the one or more printer 14 to a communication network.

The management server 11 and the external intermediary device 12 are communicably interconnected via the Internet 15. The management server 11 and the external intermediary device 12 are so-called web servers each having a global IP address and publishing its URL on the Internet 15.

Each internal intermediary device 13 is communicably connected with one or more printers 14 via a local network 16 established at a corresponding one of the branches. For instance, one internal intermediary device 13 is communicably connected with one or more printers 14 via a local network 16 provided in a branch A. Further, another internal intermediary device 13 is communicably connected with one or more printers 14 via a local network 16 provided in a branch B. Each local network 16 is a so-called intranet. Examples of the local networks 16 may include, but are not limited to, a wired LAN, a wireless LAN, a WAN, and a combination of at least two of them. Each local network 16 is connected with the Internet 15 via a gateway device 18 such as a router or a bridge. Each gateway device 18 transmits, via the Internet 15, an HTTP request transmitted by a corresponding internal intermediary device 13 through a corresponding local network 16. Then, when receiving an HTTP response to the HTTP request via the Internet 15, each gateway device 18 transmits the received HTTP response to the corresponding internal intermediary device 13 via the corresponding local network 16. Namely, each gateway device 18 is configured to establish a so-called firewall. In an example shown in FIG. 1, three local networks 16 are established, each of which is connected with two or three printers 14. However, the number of local networks 16 and the number of printers 14 connected with each local network 16 are not limited to the numbers as illustrated. It is noted that, in FIG. 1, only the gateway device 18 connected with one local network 16 is shown, and the gateway device 18 connected with the other local networks 16 are not shown for a sake of simplicity.

Each printer 14 is communicably connected with the corresponding internal intermediary device 13 via the corresponding local network 16. For instance, the one or more printers 14 belonging to the branch A are communicably connected with the corresponding internal intermediary device 13 via the local network 16 established in the branch A. When a printer 14 is powered off or taken out of a corresponding branch office, the printer 14 is not connected with a corresponding local network 16. For instance, when the printer 14 is placed in the branch office, communicably connected with the local network 16, and powered on, the printer 14 is available. The connection between the printer 14 and the local network 16 may be a wired connection or a wireless LAN connection such as Wi-Fi (registered trademark) or Bluetooth (registered trademark).

Hereinafter, configurations of each printer 14, the management server 11, the external intermediary device 12, and each internal intermediary device 13 will be described in detail with reference to functional block diagrams shown in FIGS. 1 and 2A.

Each printer 14 is a printer carried and used by a user who is an employee of the aforementioned business operator. Each printer 14 includes a CPU 41, a memory 42, a communication I/F ("I/F" is an abbreviation of "interface") 43, a battery 44, a print engine 45, and a communication bus 46. It is noted that examples of the printers 14 may include, but are not limited to, a label printer and a mobile printer. Each individual printer 14 may be any type of portable printer.

For instance, the print engine 45 includes a feeder configured to feed a label, a head configured to record an image on the label, and a cutter configured to cut the label with the image recorded thereon. The head may be any type of head, such as a head configured to record an image on a label by so-called thermal transfer, and a head configured to record an image on a label by discharging ink.

The battery 44 is a rechargeable battery configured to be charged and discharged. The battery 44 is connectable with a charge-discharge circuit (not shown). The charge-discharge circuit is configured to charge the battery 44 by applying a voltage to the battery 44 and discharge the battery 44 by connecting the battery 44 to the print engine 45.

The CPU 41, the memory 42, the communication I/F 43, the charge-discharge circuit, and the print engine 45 are interconnected via a communication bus 46. Namely, the CPU 41 is connected with the communication I/F 43, the charge-discharge circuit, and the print engine 45 via the communication bus 46. The CPU 41 is configured to input information, data, commands, drive signals, and control signals to the communication I/F 43, the charge-discharge circuit, and the print engine 45 via the communication bus 46. For instance, the CPU 41 may transmit information, data, and commands to the local network 16 via the communication I/F 43, or may receive information, data, and commands from the local network 16 via the communication I/F 43. Further, the CPU 41 may input a drive signal and a control signal to the charge-discharge circuit, thereby charging or discharging the battery 44. Furthermore, the CPU 41 may input a drive signal and a control signal to the print engine 45, thereby causing the print engine 45 to record an image on a label.

The memory 42 may include a ROM, a RAM, an EEPROM, an HDD, a portable storage medium such as a USB memory, and a buffer included in the CPU 41. The memory 42 has a program storage area 47 and a data storage area 48. The program storage area 47 stores programs such as an OS 49 and a control program 50. Instructions included in the OS 49 and the control program 50 are executable by the CPU 41. The OS 49 and the control program 50 may be executed in parallel, for instance, by multitask processing.

The control program 50 is configured to, when executed, cause the CPU 41 to generate a drive signal and a control signal for recording an image represented by recording data on a label, in response to receiving a command including the recording data via the communication I/F 43. Further, the control program 50 (more exactly, the CPU 41 executing the control program 50) may send the generated drive signal and the generated control signal to the print engine 45. The control program 50 may transmit status information stored in the data storage area 48 of the memory 42 via the communication I/F 43, in response to receiving a command requesting transmission of the status information via the communication I/F 43. Further, the control program 50 may change a setting value of a print setting stored in the data storage area 48 to another setting value included in a command, in response to receiving the command requesting the printer 14 to change the setting value to the said another setting value included in the command via the communication I/F 43. The status information includes information on a status of the printer 14 and statuses of the components used in the printer 14, such as print settings, a below-mentioned battery life, a below-mentioned number of charges times, a below-mentioned head life, and a below-mentioned number of cutter uses.

The control program 50 (more exactly, the CPU 41 executing the control program 50) perform 80% charging or 100% charging based on a setting value stored in the data storage area 48. More specifically, when determining that the setting value stored in the data storage area 48 indicates "80% charging," the control program 50 charges the battery 44 to a limit voltage value. It is noted that the limit voltage value is a voltage value lower than a maximum charge voltage value of the battery 44. For instance, the limit voltage value is 80% of the maximum charge voltage value. The control program 50 charges the battery 44, for instance, until an output voltage value of the battery 44 reaches the limit voltage value. On the other hand, when determining that the setting value stored in the data storage area 48 indicates "100% charging," the control program 50 charges the battery 44 until the output voltage value of the battery 44 reaches the maximum charge voltage value. The control program 50 stores the number of 80% charges and the number of 100% charges into the data storage area 48. The number of 80% charges is the number of times the 80% charging has been performed. The number of 100% charges is the number of times the 100% charging has been performed. The control program 50 calculates the battery life based on the number of 80% charges and the number of 100% charges, and stores the calculated battery life into the data storage area 48. For instance, the control program 50 calculates an integrated number of charging times by adding the number of 80% charges multiplied by a particular coefficient (e.g., 0.6) to the number of 100% charges. The data storage area 48 previously stores a table showing an association between the integrated number of charging times and the battery life. The control program 50 identifies a battery life associated with the calculated integrated number of charging times on the table, and stores the identified battery life into the data storage area 48. For instance, the battery life may be expressed with five levels from "1" to "5." In this case, for instance, the battery life "5" may represent that the battery 44 has a longest life. It is noted that the battery life, the number of 80% charges, and the number of 100% charges are reset to their respective initial values in response to replacement of the battery 44 with another one. For instance, the initial value of the battery life is "5."

Further, for instance, the initial values of the number of 80% charges and the number of 100% charges are "0."

The printers 14 are categorized into various models, such as a model capable of performing 100% charging, a model capable of performing 100% charging and 80% charging, a model capable of calculating the battery life and storing the calculated battery life into the data storage area 48, and a model incapable of calculating the battery life. In an example shown in FIG. 3, a model name "A001" represents a model capable of performing 80% charging and 100% charging, calculating the battery life, and storing the calculated battery life into the data storage area 48. A model name "A002" represents a model capable of performing 80% charging and 100% charging but incapable of calculating the battery life. A model name "A003" represents a model capable of performing 100% charging but incapable of calculating the battery life.

In addition, the control program 50 stores an integrated number of recording times, an integrated recording length, and the head life into the data storage area 48 in response to causing the print engine 45 to perform image recording. For instance, the number of recordings represents the number of times a label has been made. For instance, the recording length represents a total length of labels on which images have been recorded.

More specifically, in response to causing the print engine 45 to perform image recording, the control program 50 calculates the number of recordings and the recording length, and adds the calculated number of recordings and the calculated recording length to the number of recordings and the recording length stored in the data storage area 48, respectively. The data storage area 48 previously stores a table showing an association of the number of recordings and the recording length with the head life. The control program 50 identifies the head life associated with the integrated number of recording times and the integrated recording length on the table, and stores the identified head life into the data storage area 48. For instance, the head life may be expressed with five levels from "1" to "5." In this case, for instance, the head life "5" may represent a longest head life. The head life, the number of recordings, and the recording length are reset to their respective initial values in response to replacement of the head with a new one. For instance, the initial value of the head life is "5." The initial values of the number of recordings and the recording length are "0."

The printers 14 have various models, such as a model capable of counting the number of recordings, a model capable of counting the number of recordings and the recording length, a model capable of calculating the head life, and a model incapable of calculating the head life. In the example shown in FIG. 3, the model name "A001" represents a model capable of counting the number of recordings and the recording length and of calculating the head life. The model name "A002" represents a model capable of counting the number of recordings and recording length but incapable of calculating the head life. The model name "A003" represents a model capable of counting only the number of recordings but incapable of counting the recording length or calculating the head life.

In addition, the control program 50 accumulates the number of cutter uses stored in the data storage area 48 in response to driving the cutter of the print engine 45 to cut the label. It is noted that the number of cutter uses is the number of times the cutter of the print engine 45 has been used. For instance, when the label used in a printer 14 is an indefinite length roll of paper, the control program 50 drives the cutter to cut the label each time an image is recorded on the label. It is noted that when the label used in a printer 14 is so-called die-cut paper, the cutter of the print engine 45 may not be used.

The printers 14 may have various models such as a model having the cutter and a model not having the cutter.

Figures 2A, 2B, 2C:
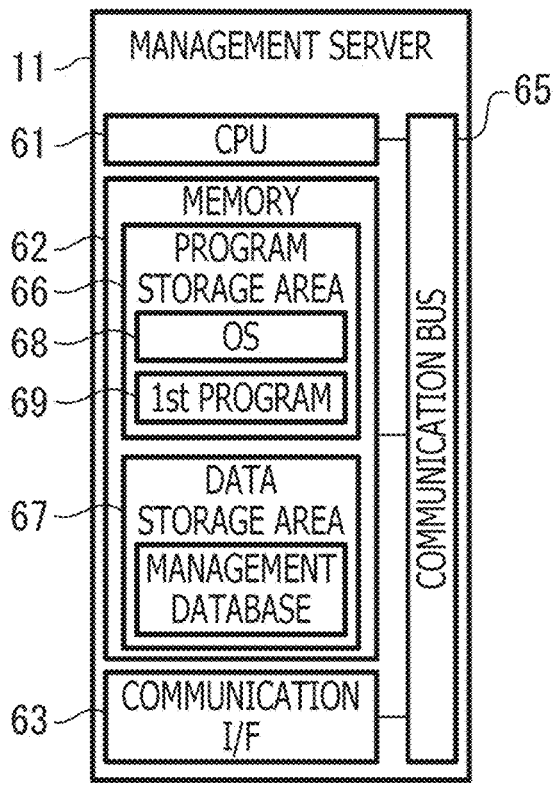
FIG. 2A is a functional block diagram schematically showing a configuration of a management server included in the communication system in the illustrative embodiment according to one or more aspects of the present disclosure.
FIG. 2B shows an example of a first association table stored in each internal intermediary device included in the communication system in the illustrative embodiment according to one or more aspects of the present disclosure.
FIG. 2C shows an example of a second association table stored in each internal intermediary device included in the communication system in the illustrative embodiment according to one or more aspects of the present disclosure.

As shown in FIG. 2A, the management server 11 includes a CPU 61, a memory 62, a communication I/F 63, and a communication bus 65. The CPU 61, the memory 62, the communication I/F 63, and the communication bus 65 have substantially the same configurations as the configurations of the CPU 41, the memory 42, the communication I/F 43, and the communication bus 46 of each printer 14. Hence, detailed explanations thereof will be omitted.

The memory 62 has a program storage area 66 and a data storage area 67. The program storage area 66 stores programs such as an OS 68 and a first program 69. The program storage area 66 and the data storage area 67 have substantially the same configurations as the configurations of the program storage area 47 and the data storage area 48 of each printer 14. Hence, detailed explanations thereof will be omitted. Examples of the OS 68 may include, but are not limited to, MacOS (registered trademark), Windows (registered trademark), Linux (registered trademark), and Android (registered trademark) OS.

The first program 69 is configured to, when executed, cause the CPU 61 to transmit management information to an administrator terminal 17 (e.g., a personal computer and a tablet computer) used by the administrator in response to a request from the administrator terminal 17, or cause the CPU 61 to receive an instruction from the administrator terminal 17. Further, the first program 69 may, when executed, cause the CPU 61 to transmit information, data, or a command to the external intermediary device 12 in accordance with an instruction received from the administrator terminal 17. Further, the first program 69 may, when executed, cause the CPU 61 to register information and data received from the external intermediary device 12 onto a management database (see FIG. 3) stored in the memory 62. The first program 69 may be a single program or an aggregate of a plurality of programs. Details of processing performed by the CPU 61 executing the first program 69 will be described later.

The storage area 67 stores data necessary for execution of the programs. Further, the data storage area 67 contains the management database as shown in FIG. 3.

The management database has a plurality of items and a plurality of records. For instance, the plurality of items may include, but are not limited to, at least two of "Serial Number," "Model Name," "Internal Identification Information," "Battery Information," "Head Information," "Number of Cutter Uses," "Print Settings," and "Update Date." It is noted that the management database may include one or more items other than the above items, or may not have some of the above items.

The item "Serial Number" represents a serial number assigned to each printer 14. Each record is identified by the serial number. Namely, the "Serial Number" is also information for identifying each of the records registered on the management database. A single record indicates a single printer 14.

The item "Model Name" indicates a model name of each printer 14. For each record, the model name is input into an entry input field associated with the item "Model Name." In an example shown in FIG. 3, a model name of "A001" is input for a record having "12345" as the "Serial Number" thereof.

The item "Internal Identification Information" represents identification information assigned to each internal intermediary device 13. For instance, the internal identification information may be a GUID assigned to each internal intermediary device 13 by the first program 69 of the management server 11 or a second program 29 of the external intermediary device 12. The first program 69 of the management server 11 or the second program 29 of the external intermediary device 12 may assign the internal identification information to each internal intermediary device 13 and may register the internal identification information onto the database, for instance, before the communication system 10 begins to be operated. The internal identification information indicates via which internal intermediary device 13 and which local network 16 the printer 14 identified by each record is connected. For instance, the printer 14 identified by the record having "12345" as the "Serial Number" is connected via the internal intermediary device 13 identified by the internal identification information "ABCD" and the associated local network 16.

The item "Battery Information" has sub-items "Battery Life," "Number of 80% Charges," and "Number of 100% Charges." The sub-item "Battery Life" represents the life of the battery 44 incorporated in the printer 14 identified by each record. The sub-item "Number of 80% Charges" represents the number of times the 80% charging has been performed. The sub-item "Number of 100% Charges" represents the number of times the 100% charging has been performed. In the example shown in FIG. 3, in the record having the serial number "12345," values "1," "210," and "86" are input in the entry fields for the sub-items "Battery Life," "Number of 80% Charges," and "Number of 100% Charges," respectively.

The item "Head Information" has sub-items "Head Life," "Recording Count," and "Recording Length." The sub-item "Head Life" represents the life of the head used in the printer 14 identified by each record. The sub-item "Number of Recordings" represents the number of labels made by the corresponding printer 14. The sub-item "Recording Length" represents the total length of the labels on which images have been recorded by the corresponding printer 14.

The item "Number of Cutter Uses" represents the number of times the cutter has been driven in the printer 14 identified by each record. The item "Update Date" represents the last date when the information (e.g., the battery life and the head life) registered for the corresponding printer 14 has been updated. For instance, when a printer 14 is taken out of the corresponding branch, or the printer 14 is powered off, none of the registered information such as the battery life and the head life is updated. In other words, the item "Update Date" represents the last date when the information such as the battery life and the head life registered for the corresponding printer 14 has been updated in a state where the printer 14 was in the corresponding branch.

The item "Print Settings" has a sub-item "Recording Density." The sub-item "Recording Density" represents a density of an image to be recorded on the label. For instance, the recording density may be expressed with five levels from "1" to "5." In this case, for instance, the recording density "5" represents that the image is to be recorded on the label with a highest density.

In addition, the data storage area 67 stores a third association table (not shown). The third association table is a table showing an association between an instruction (see S11 in FIG. 4) input from the administrator terminal 17 and a command corresponding to the instruction. On the third association table, a command corresponding to an instruction from the administrator is identified. The details will be described later.

The external intermediary device 12 includes a CPU 21, a memory 22, a communication I/F 23, and a communication bus 25. Configurations of the CPU 21, the memory 22, the communication I/F 23, and the communication bus 25 are substantially the same as the configurations of the CPU 41, the memory 42, the communication I/F 43, and the communication bus 46 of each printer 14. Hence, detailed explanations thereof will be omitted.

The memory 22 has a program storage area 26 and a data storage area 27. The program storage area 26 stores programs such as an OS 28 and the second program 29. Configurations of the program storage area 26 and the data storage area 27 are substantially the same as the configurations of the program storage area 47 and the data storage area 48 of each printer 14, and a configuration of the OS 28 is substantially the same as the OS 68 of the management server 11. Hence, detailed explanations thereof will be omitted.

The second program 29 is configured to, when executed by the CPU 21, cause the CPU 21 to receive an instruction transmitted by the management server 11 and transmit a command corresponding to the received instruction to a specified internal intermediary device 13. Further, the second program 29 is configured to, when executed, cause the CPU 21 to receive information and data transmitted by an internal intermediary device 13 and register the received information and data onto the management database stored in the data storage area 27. Further, the second program 29 is configured to, when executed, cause the CPU 21 to receive information and data transmitted by an internal intermediary device 13 and transmit the received information and data to the management server 11. The second program 29 may be a single program or an aggregate of a plurality of programs. Details of processing performed by the CPU 21 executing the second program 29 will be described later.

The data storage area 27 stores data necessary for executing the programs. Further, the data storage area 27 stores the aforementioned management database (see FIG. 3). It is noted that the management database stored in the data storage area 67 of the management server 11 and the management database stored in the data storage area 27 of the external intermediary device 12 may have the same configuration or may have different configurations. For instance, the management database allocated in the data storage area 67 of the management server 11 may not have the item "Internal Identification Information."

Further, the data storage area 27 stores a fourth association table (not shown). The fourth association table shows an association between an instruction command input from the management server 11 and a command transmitted to an internal intermediary device 13.

Each internal intermediary device 13 includes a CPU 31, a memory 32, a communication I/F 33, and a communication bus 35. Configurations of the CPU 31, the memory 32, the communication I/F 33, and the communication bus 35 are substantially the same as the configurations of the CPU 41, the memory 42, the communication I/F 43, and the communication bus 46 of each printer 14. Hence, detailed explanations thereof will be omitted.

The memory 32 has a program storage area 36 and a data storage area 37. The program storage area 36 stores programs such as an OS 38 and a third program 39. Configurations of the program storage area 36 and the data storage area 37 are substantially the same as the configurations of the program storage area 66 and the data storage area 67 of the management server 11. Further, a configuration of the OS 38 is substantially the same as the OS 68 of the management server 11. Hence, detailed explanations thereof will be omitted.

The third program 39 is configured to, when executed by the CPU 31, cause the CPU 31 to receive an instruction command transmitted by the external intermediary device 12 and transmit an instruction corresponding to the received instruction command to a specified printer 14. Further, the third program 39 is configured to, when executed, cause the CPU 31 to receive status information transmitted by a printer 14 and transmit the received status information to the external intermediary device 12. The third program 39 may be a single program or an aggregate of a plurality of programs. Details of processing performed by the CPU 31 executing the third program 39 will be described later.

The data storage area 37 stores data necessary for execution of the programs. Further, the data storage area 37 stores a first association table shown in FIG. 2B and a second association table shown in FIG. 2C. The first association table shows an association between the serial number and the model name of each printer 14. Each of the serial numbers registered on the first association table stored in an individual internal intermediary device 13 is a serial number assigned to a corresponding one of the printers 14 connected with the internal intermediary device 13 via the corresponding local network 16. In other words, the first association table shows the model names of the printers 14 communicable with the internal intermediary device 13 via the corresponding local network 16.

The second association table associates a model name of each printer 14 with commands Even the same instruction may provide different commands depending on the model name. Further, there may be an instruction that is unable to be input depending on the model name. The second association table is used for the third program 39 of the internal intermediary device 13 to generate a command to be transmitted to each corresponding printer 14 via the corresponding local network 16.

Hereinafter, referring to FIGS. 4 to 7B, explanations will be provided of processes to be performed by execution of the first program 69 of the management server 11, the second program 29 of the external intermediary device 12, the third program 39 of each internal intermediary device 13, and the control program 50 of each printer 14.

Figure 5:
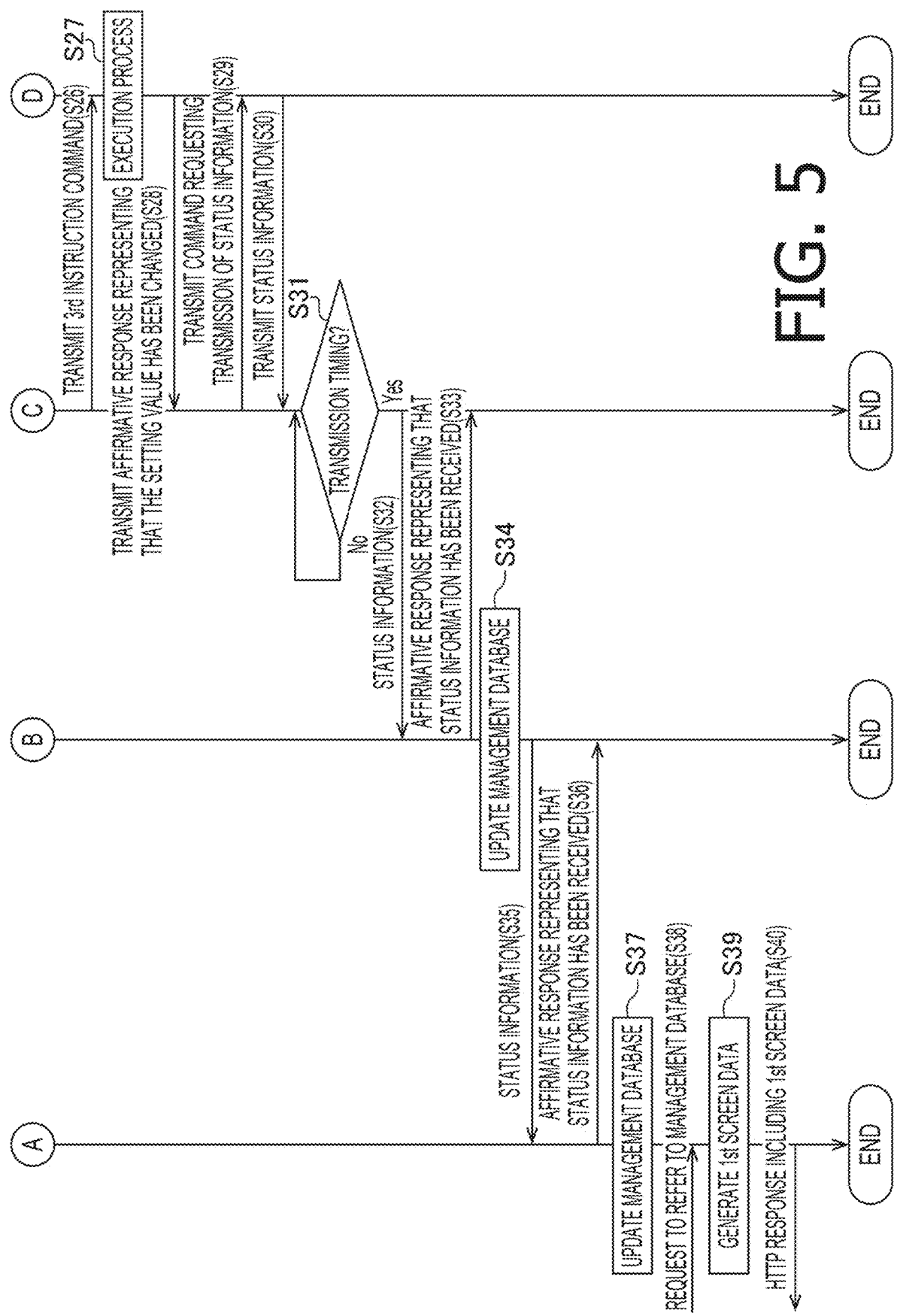

First, a process by the administrator to provide an instruction to each specified printer 14 through the management server 11 will be described with reference to FIGS. 4 and 5.

The first program 69 (more exactly, the CPU 61 executing the first program 69) of the management server 11 receives an administrator's instruction from the administrator terminal 17 via the communication I/F 63 (S11). More specifically, the administrator activates a browser of the administrator terminal 17 (see FIG. 1), accesses the URL published on the Internet 15 by the management server 11, and displays the web page published by the management server 11 on a display of the administrator terminal 17. Then, by operating a user I/F (e.g., a mouse and a keyboard) of the administrator terminal 17, the administrator sends an HTTP request including an instruction corresponding to contents displayed on the display, to the management server 11 via the administrator terminal 17. The HTTP request including the instruction is received by the management server 11 via the Internet 15. Examples of the instruction may include, but are not limited to, an instruction to change the print settings for each specified printer 14, an instruction to change a version of the control program 50 of each specified printer 14, and an instruction to obtain latest status information of each specified printer 14. Further, the instruction includes the serial number of each specified printer 14. Hereinafter, an explanation will be provided of a sequence of processes in an example case where the instruction received in S11 is an instruction to set the recording density for each printer 14 associated with the model name "A001" to "3."

The first program 69 of the management server 11 generates a first instruction command corresponding to the received instruction by using the aforementioned third association table (S12). For instance, on the third association table, an instruction "Setting of Density" is associated with a command J. The first program 69 generates the first instruction command by adding a setting value "3" and the serial numbers included in the aforementioned instruction to the command J associated with to the instruction "Setting of Density." Then, the first program 69 transmits the generated first instruction command to the external intermediary device 12 via the communication I/F 63 and the Internet 15 (S13).

The second program 29 of the external intermediary device 12 receives the first instruction command via the communication I/F 23 (S13). In response to receiving the first instruction command, the second program 29 transmits an affirmative response representing that the first instruction command has been received, to the management server 11 via the communication I/F 23 and the Internet 15 (S14). In addition, the second program 29 identifies, on the management database (FIG. 3), records having the same serial numbers as included in the received first instruction command (S15). Then, the second program 29 identifies internal identification information registered in the identified records (S16). In other words, in S16, the internal intermediary device 13 to which instructions are to be transmitted is identified.

Next, the second program 29 of the external intermediary device 12 generates a second instruction command corresponding to the received first instruction command by using the aforementioned fourth association table (S17). For instance, on the fourth association table, the aforementioned command J and a command K are associated with each other. The first program 69 generates the second instruction command by adding a setting value "3" and the serial numbers included in the first instruction command to the command K associated with the command J. Then, the second program 29 waits until the second program 29 receives an HTTP request transmitted by the internal intermediary device 13 provided with the internal identification information identified in S16.

Each internal intermediary device 13 performs a polling process to periodically transmit an HTTP request to the external intermediary device 12. Specifically, the third program 39 of each internal intermediary device 13 starts time measurement by a countdown timer after transmitting the last HTTP request to the external intermediary device 12, and determines whether the time measurement by the countdown timer has ended, i.e., whether a transmission timing has come (S18). An initial value of the countdown timer is previously stored in the memory 32. For instance, the initial value may be several minutes to several tens of minutes. The third program 39 waits until the transmission timing comes (S18: No). When determining that the transmission timing has come (S18: Yes), the third program 39 transmits an HTTP request including the internal identification information assigned to the corresponding to the internal intermediary device 13, to the external intermediary device 12 via the communication I/F 33 and the Internet 15 (S19).

The second program 29 of the external intermediary device 12 receives the HTTP request from each internal intermediary device 13 via the communication I/F 23 (S19). Then, the second program 29 determines whether the internal identification information included in each of the received HTTP requests is identical to the internal identification information identified in S16 (S20). In other words, in S20, the second program 29 determines whether each internal intermediary device 13 that has transmitted a corresponding one of the received HTTP requests is the internal intermediary 13 that is to transmit the second instruction command.

When determining that the internal identification information included in one of the received HTTP requests is not identical to the internal identification information identified in S16 (S20: No), the second program 29 of the external intermediary device 12 transmits an HTTP response that does not include the second instruction command to the corresponding internal intermediary device 13 via the communication I/F 23 and the Internet 15 (S21). When determining that the internal identification information included in one of the received HTTP requests is identical to the internal identification information identified in S16 (S20: Yes), the second program 29 transmits an HTTP response including the second instruction command to the corresponding internal intermediary device 13 via the communication I/F 23 and the Internet 15 (S22).

The third program 39 of each internal intermediary device 13 receives the HTTP response from the external intermediary device 12 via the communication I/F 33 (S21, S22). Then, the third program 39 determines whether the received HTTP response includes the second instruction command (S23). When determining that the received HTTP response does not include the second instruction command (S23: No), the third program 39 waits until a next transmission timing comes (S18). When determining that the received HTTP response includes the second instruction command (S23: Yes), the third program 39 transmits an HTTP request including a notification representing that the second instruction command has been received, to the external intermediary device 12 via the communication I/F 33 and the Internet 15 (S24).

Moreover, the third program 39, of the internal intermediary device 13 that has received the second instruction command, identifies a model name associated with the serial numbers included in the received second instruction command on the first association table. Subsequently, the third program 39 identifies a command associated with the second instruction command and the identified model name on the second correspondence table. Specifically, when the identified model name is "A001," the third program 39 identifies a command B associated with the command K, which is the second instruction command, and the identified model name "A001," on the second correspondence table. Then, the third program 39 generates a third instruction command by adding a setting value "3" to the identified command B (S25). As shown in FIG. 5, the third program 39 transmits the generated third instruction command to the printers 14 associated with the serial numbers included in the second instruction command via the communication I/F 33 and the corresponding local network 16 (S26).

The control program 50 of each specified printer 14 receives the third instruction command via the communication I/F 43 (S26). The control program 50 performs an execution process to set the recording density to "3" according to the received third instruction command (S27). Then, the control program 50 transmits an affirmative response representing that the setting value has been changed, to the internal intermediary device 13 via the communication I/F 43 and the corresponding local network 16 (S28).

The third program 39 of the internal intermediary device 13 receives the affirmative response from each corresponding printer 14 via the communication I/F 33 (S28). In response to receiving the affirmative response, the third program 39 transmits a command requesting transmission of status information, to each corresponding printer 14 via the communication I/F 33 and the local network 16 (S29).

The control program 50 of each specified printer 14 receives the command from the corresponding internal intermediary device 13 via the communication I/F 43 (S29). The control program 50 transmits the status information stored in the memory 42 to the internal intermediary device 13 via the communication I/F 43 and the local network 16 in accordance with the received command (S30). The status information includes the recording density as well as other information such as the battery life, the head life, and the number of cutter uses.

The third program 39 of the internal intermediary device 13 receives the status information from each corresponding printer 14 via the communication I/F 33 (S30). Then, the third program 39 determines whether the transmission timing has come, in substantially the same manner as in the aforementioned step S18 (S31). When determining that the transmission timing has come (S31: Yes), the third program 39 transmits an HTTP request including the received status information to the external intermediary device 12 via the communication I/F 33 and Internet 15 (S32).

The second program 29 of the external intermediary device 12 receives the HTTP request including the status information from the internal intermediary device 13 via the communication I/F 23 (S32). Then, the second program 29 transmits an HTTP response including an affirmative response representing that the status information has been received, to the internal intermediary device 13 via the communication I/F 23 and the Internet 15 (S33).

The second program 29 of the external intermediary 12 registers the status information included in the HTTP request received in S32 onto the management database, thereby updating the management database (S34). In addition, the second program 29 transmits the received status information to the management server 11 via the communication I/F 23 and the Internet 15 (S35).

The first program 69 of the management server 11 receives the status information from the external intermediary device 12 via the communication I/F 63 (S35). Then, the first program 69 transmits an affirmative response representing that the status information has been received, to the external intermediary device 12 via the communication I/F 63 and the Internet 15 (S36). In addition, the first program 69 of the management server 11 registers the status information received in S35 onto the management database, thereby updating the management database (S37).

On the other hand, the administrator activates the browser of the administrator terminal 17 and sends an HTTP request including a request to refer to the management database to the management server 11 via the Internet 15 (S38). The first program 69 of the management server 11 receives the HTTP request from the administrator terminal 17 via the communication I/F 63 (S38). In response to receiving the HTTP request including the request to refer to the management database, the first program 69 generates first screen data including the information registered on the management database (S39). The first screen data is data representing a first screen (see FIG. 9A).

The first program 69 of the management server 11 transmits an HTTP response including the generated first screen data to the administrator terminal 17 via the communication I/F 63 and the Internet 15 (S40). The browser of the administrator terminal 17 receives the HTTP response including the first screen data, and displays the first screen represented by the first screen data included in the received HTTP response on the display of the administrator terminal 17. The administrator sees the first screen (see FIG. 9A) displayed on the display, and confirms that the recording density of each specified printer 14 has been set to "3."

Figure 6:
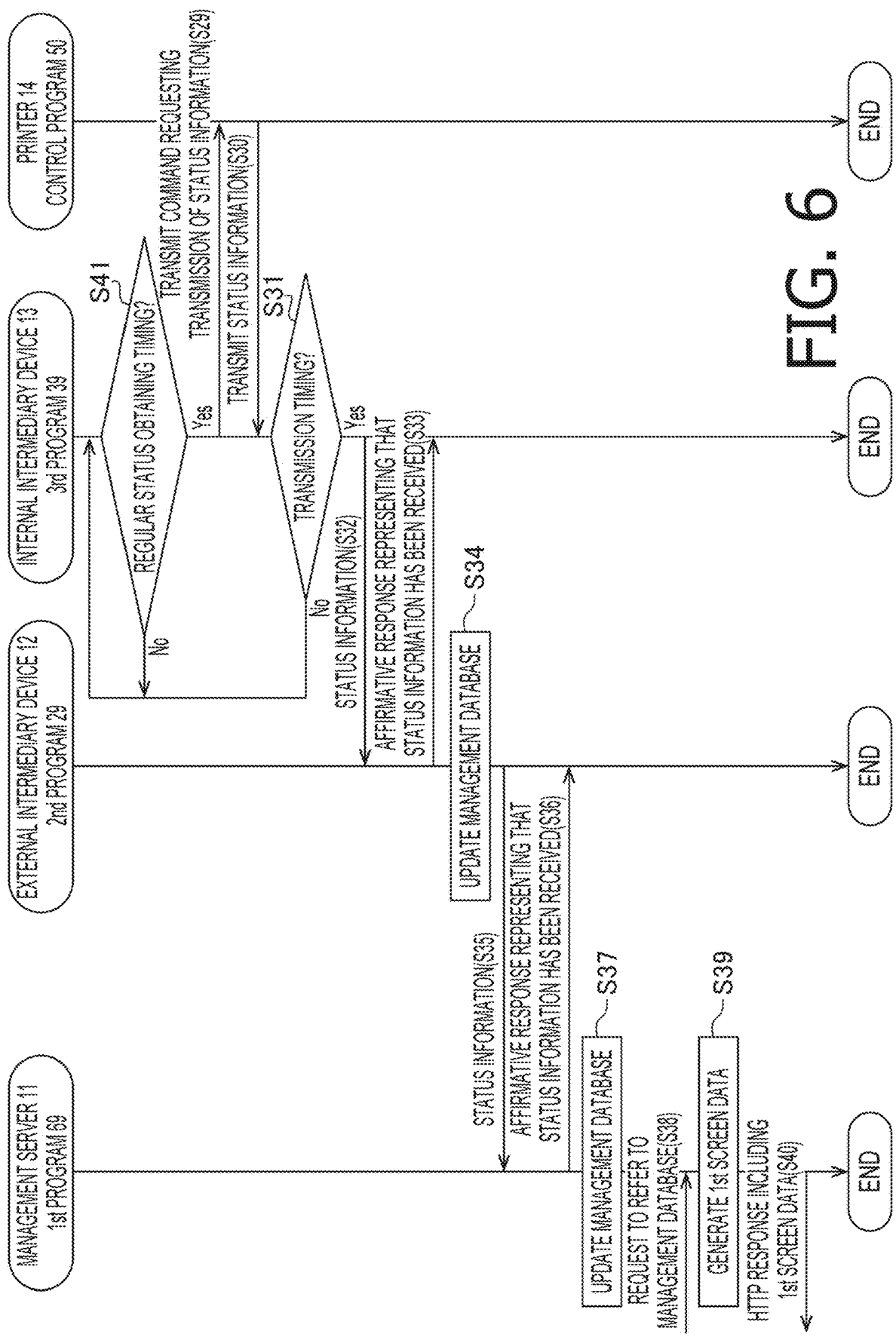
FIG. 6 shows a sequence of processes to be performed by the management server, the external intermediary device, each internal intermediary device, and each printer when status information of each printer is regularly obtained and registered onto the management database, in the illustrative embodiment according to one or more aspects of the present disclosure.

Next, referring to FIG. 6, an explanation will be provided of a sequence of processes in which the management server 11 and the external intermediary device 12 regularly obtain the status information from each printer 14 and regularly update the management database. It is noted that substantially the same processes as described with reference to FIGS. 4 and 5 will be provided with the same reference characters, and detailed explanations thereof may be omitted.

The third program 39 of each internal intermediary device 13 determines whether a regular status obtaining timing for regularly obtaining the status information has become (S41). Specifically, the third program 39 determines whether an elapsed period of time since the last time when the status information was obtained from each corresponding printer 14 has reached a threshold period previously stored in the memory 32. For instance, the threshold period may be several minutes to several tens of minutes. The third program 39 waits until it is determined that the regular status obtaining timing has come (S41: No). When determining that the regular status obtaining timing has come (S41: Yes), the third program 39 performs a process of the aforementioned steps S29 to S33. Specifically, the third program 39 obtains the status information from each corresponding printer 14 and transmits an HTTP request including the obtained status information to the external intermediary device 12.

Then, the second program 29 of the external intermediary device 12 performs a process of the aforementioned steps S32 to S36. Specifically, the second program 29 receives the HTTP request including the status information, registers the received status information onto the management database, and transmits the received status information to the management server 11.

Then, the first program 69 of the management server 11 performs a process of the aforementioned steps S35 to S40. Specifically, the first program 69 receives the status information, registers the received status information onto the management database, generates first screen data in response to a request from the administrator terminal 17, and transmits the generated first screen data to the administrator terminal 17.

Subsequently, a process to transmit notification information representing that the battery 44 needs to be replaced will be described with reference to FIGS. 7A and 7B.

Figure 7A:
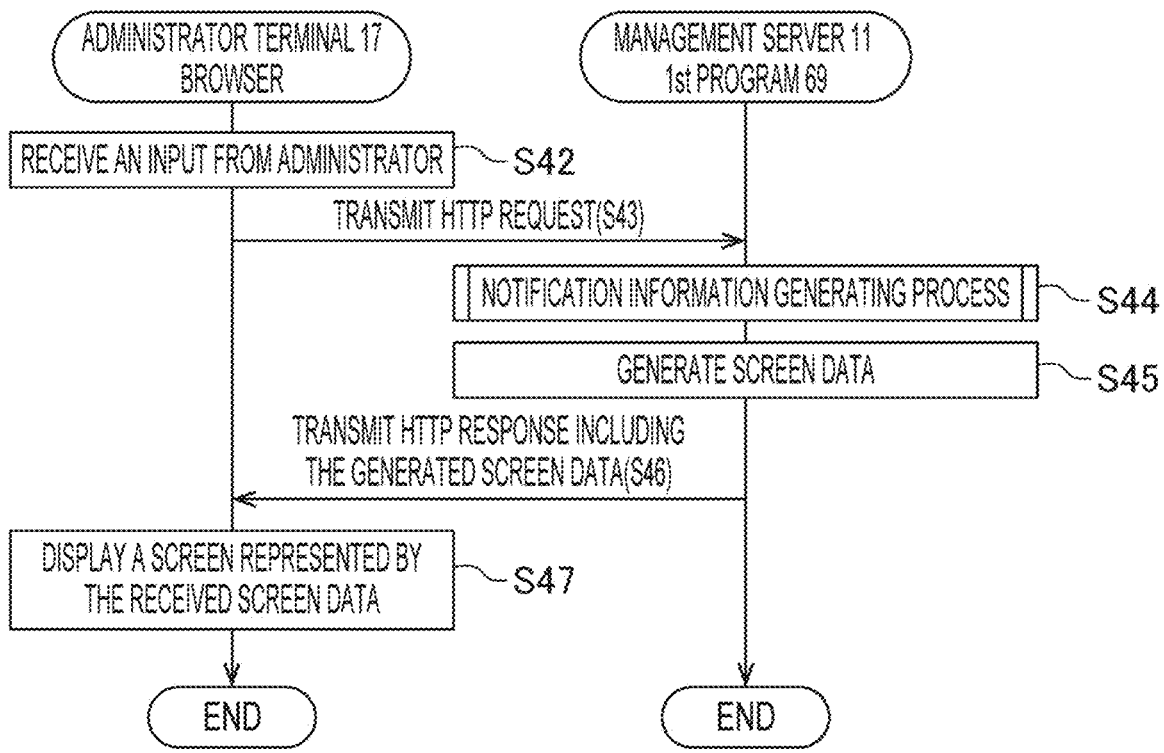
FIG. 7A shows a sequence of processes to be performed by an administrator terminal and the management server in response to the administrator terminal receiving an instruction from an administrator, in the illustrative embodiment according to one or more aspects of the present disclosure.

As shown in FIG. 7A, the administrator activates the browser of the administrator terminal 17 in order to refer to management information registered on the management database or to instruct each printer 14 to set a setting value. The browser of the administrator terminal 17 receives an input from the administrator, such as an instruction to refer to the management information or an instruction to change a setting value, via the mouse or the keyboard (S42). The browser transmits an HTTP request including the received instruction to the management server 11 via the Internet 15 (S43).

The first program 69 of the management server 11 receives the HTTP request from the administrator terminal 17 via the communication I/F 63 and the Internet 15 (S43). The first program 69 performs a notification information generating process (S44) in response to receiving the HTTP request including the instruction from the administrator. In the notification information generating process, the first program 69 determines whether there is a printer 14 of which the battery life is "1," and when determining that there is a printer 14 of which the battery life is "1," generates notification information to notify the administrator that the battery 44 of the printer 14 needs to be replaced. The notification information generating process will be described with reference to FIG. 7B.

First, the first program 69 of the management server 11 reads out a record registered on the management database, and determines whether a battery life is registered in the read record (S51). When determining that the battery life is registered in the read record (S51: Yes), the first program 69 determines the battery life registered in the record as a specific battery life subject to determination in a below-mentioned step S57 (S52). In other words, when a read piece of the status information received in S35 includes a battery life, the first program 69 determines, as the specific battery life, the battery life included in the received status information received in S35.

On the other hand, when determining that a battery life is not registered in the readout record (S51: No), the first program 69 determines whether the number of 80% charges is registered in the read record (S53). When determining that the number of 80% charges is registered in the read record (S53: Yes), the first program 69 calculates an integrated number of charging times by integrating the number of 80% charges and the number of 100% charges (S54). Specifically, the first program 69 calculates the integrated number of charging times by adding the number of 100% charges to the number of 80% charges multiplied by a particular coefficient (e.g., 0.6). Then, the first program 69 determines the specific battery life as a battery life of the printer 14 identified by the read record, based on the integrated number of charging times calculated in S54 (S55). For instance, the memory 62 of the management server 11 previously stores a table associating the number of charging times with the battery life. The first program 69 determines, as the specific battery life, a battery life associated with the calculated integrated number of charging times on the table.

Meanwhile, when determining that the number of 80% charges is not registered in the read record (S53: No), the first program 69 determines the specific battery life based on the number of 100% charges registered in the read record (S56).

As described above, when a read piece of the status information received in S35 does not include a battery life, the first program 69 determines the specific battery life based on the number of 80% charges and/or the number of 100% charges.

After determining the specific battery life in one the steps S52, S55 and S56, the first program 69 determines whether the determined specific battery life is "1" (S57). When determining that the specific battery life is "1" (S57: Yes), the first program 69 generates notification information representing that the battery 44 needs to be replaced (S58). For instance, the notification information may include a text "The battery needs to be replaced," a text "Please replace the battery," or "The battery has only a short life left." Meanwhile, when determining that the specific battery life is not "1" (S57: No), the first program 69 stores the determined specific battery life into the memory 62 (S59).

Although the following features are not shown in the flowchart, after performing the process of S51 to S59 for a read record, the first program 69 reads out a next record and performs the process of S51 to S59 for the next record. After performing the process of S51 to S59 for all of the records registered on the management database, the first program 69 terminates the notification information generating process.

As shown in FIG. 7A, after completion of the notification information generating process, the first program 69 generates second screen data including the generated notification information (S45). If there is no notification information generated, the first program 69 generates third screen data including the specific battery life stored in the memory 62 (S45). The first program 69 transmits an HTTP response including the generated second screen data or the generated third screen data to the administrator terminal 17 via the communication I/F 63 and the Internet 14 (S46).

The browser of the administrator terminal 17 receives the HTTP response from the management server 11, and displays a second screen represented by the second screen data included in the received HTTP response, or a third screen represented by the third screen data included in the received HTTP response, on the display of the administrator terminal 17 (S47).

The second screen data represents the second screen as shown in FIG. 9B. In an example shown in FIG. 9B, the second screen is a pop-up screen including texts "Serial Number," "Model Name", "Branch Name", and "Battery Life (5 levels)." Below the texts "Serial Number," "Model Name," "Branch Name", and "Battery Life (5 levels)," serial numbers, model names, branch names, and the specific battery life "1" of the records of which the specific battery lives are determined to be "1" in the notification information generating process, are displayed. Further, the second screen includes text information "The batteries need to be replaced." Namely, the second screen makes the administrator recognize that the batteries 44, of the printers 14 associated with the serial numbers displayed thereon, need to be replaced. In addition, the branch names "Branch A" and "Branch C" displayed on the second screen make the administrator recognize which branch each printer 14 of which the battery 44 needs to be replaced is used in. Furthermore, the second screen may include text information indicating types of the batteries 44. In this case, for instance, the memory 62 of the management server 11 may previously store a table associating the model name of each printer 14 and the type of the corresponding battery 44. The first program 69 of the management server 11 may identify, on the table, type information of the batteries 44 associated with the model names included in the second screen data, and may incorporate the identified types of the batteries 44 into the second screen data. The types of the batteries 44 displayed on the second screen make the administrator recognize the types of batteries 44 to be purchased.

The third screen data represents the third screen as shown in FIG. 9C. As illustrated in FIG. 9C, the third screen is a screen on which the specific battery lives determined in the notification information generating process are displayed instead of "–" displayed below the text "Battery Life" on the aforementioned first screen (see FIG. 9A). In the illustrated example, the specific battery life determined in the notification information generating process is displayed for each of the records associated with the serial numbers from "45678" to "90123." In other words, on the third screen, an alternative battery life (i.e., the specific battery life determined in the notification information generating process) is displayed with respect to each of the printers 14 for which the battery lives were unable to be calculated. The battery lives displayed on the third screen may cause the administrator to guess when the corresponding batteries 44 should be replaced.

It is noted that when the instruction input into the administrator terminal 17 by the administrator in S42 is a request to refer to the management database, and the notification information is generated in the notification information generating process, the first program 69 transmits to the administrator terminal 17 the second screen data as well as the first screen data. In this case, for instance, the second screen may pop up on the first screen. When the instruction input into the administrator terminal 17 by the administrator in S42 is a request to refer to the management database, and the notification information is not generated in the notification information generating process, the first program 69 transmits to the administrator terminal 17 the third screen data instead of the first screen data.

In addition, an explanation will be provided of a case where the instruction input into the administrator terminal 17 by the administrator in S42 is an instruction to change a setting value, that is, a case where the HTTP request input into the management server 11 from the administrator terminal 17 in S43 is the instruction input into the management server 11 from the administrator terminal 17 in S11 (see FIG. 4). In this case, the process of S46 may correspond to the process of S40 in FIG. 5. Specifically, when the first program 69 generates the notification information in the notification information generating process, the second screen data may be transmitted to the administrator terminal 17 in S40. Further, when the first program 69 does not generate the notification information in the notification information generating process, the third screen data may be transmitted to the administrator terminal 17 instead of the first screen data in S40.

Operations and Advantageous Effects of Illustrative Embodiment

The first program 69 (more exactly, the CPU 61 executing the first program 69) generates the notification information representing that the battery 44 needs to be replaced, based on usage information (e.g., the number of 80% charges and the number of 100% charges) regarding the use of the battery 44. Thus, the first program 69 may cause the administrator to manage the batteries 44 that deteriorate with use.

In addition, the first program 69 transmits the generated notification information to the administrator terminal 17. Accordingly, the first program 69 may make the administrator aware that the battery 44 needs to be replaced, when the battery 44 has only a short life left.

In addition, the first program 69 transmits the HTTP response including the generated notification information to the administrator terminal 17. Thereby, the notification information is displayed on the display of the administrator terminal 17 when the administrator is operating the administrator terminal 17. Therefore, the first program 69 may cause the administrator to visually recognize the notification information more certainly than when the notification information is sent by e-mail.

In addition, when the received status information includes the battery life, the first program 69 determines the battery life included in the received status information to be the specific battery life. Further, when the received status information does not include the battery life, the first program 69 determines the specific battery life based on both the number of 80% charges and the number of 100% charges or on the number of 100% charges. Then, when the determined specific battery life is "1," the first program 69 generates the notification information. Accordingly, the first program 69 may determine the specific battery life and generate the notification information, regardless of whether the status information transmitted by each printer 14 includes the battery life.

In addition, the first program 69 transmits the determined specific battery life to the administrator terminal 17. Thereby, the first program 69 may make the administrator aware of a current remaining life of the battery 44 incorporated in each printer 14. Thus, for instance, the administrator may estimate how soon the battery 44 will need to be replaced, based on the specific battery life.

The first program 69 transmits the first instruction command to the external intermediary device 12, thereby inputting the third instruction command corresponding to the instruction from the administrator into each specified printer 14 via the external intermediary device 12 and the corresponding internal intermediary device 13. Thus, the first program 69 may cause the administrator to manage the printers 14 incapable of communicating directly with the management server 11 via the Internet 15. In addition, when there is a need for replacement of the battery 44, the first program 69 may make the administrator recognize the notification information representing that the battery 44 needs to be replaced.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications according to aspects of the present disclosure are feasible.

First Modification

In the aforementioned illustrative embodiment, an example has been described in which the first program 69 of the management server 11 (more exactly, the CPU 61 executing the first program 69) performs the notification information generating process (see FIG. 7B) to generate the notification information representing that the battery 44 needs to be replaced. However, the first program 69 may perform a notification information generating process as shown in FIG. 8A, instead of or together with the notification information generating process shown in FIG. 7B. The notification information generating process shown in FIG. 8A is a process to generate notification information representing that there is a need for replacement or maintenance of the head of the print engine 45.

More specifically, the first program 69 of the management server 11 determines whether a head life (see FIG. 3) is registered in the read record (S61). When determining that a head life is registered in the read record (S61: Yes), the first program 69 determines the registered head life as a specific head life subject to determination in a below-mentioned step S67 (S62). Meanwhile, when determining that a head life is not registered in the read record (S61: No), the first program 69 determines whether a recording length (see FIG. 3) is registered in the read record (S63). When determining that a recording length is registered in the read record (S63: Yes), the first program 69 determines a specific head life based on the registered recording length (S65). For instance, the memory 62 of the management server 11 previously stores a table showing an association between the recording length and the head life. The first program 69 determines, as the specified head life, a head life associated with the recording length registered in the read record on the table.

When determining that a recording length is not registered in the read record (S63: No), the first program 69 determines the specific head life based on the number of recordings registered in the read record (S66). For example, the memory 62 of the management server 11 previously stores a table showing an association between the number of recordings and the head life. The first program 69 determines, as the specific head life, a head life associated with the number of recordings registered in the read record on the table.

After determining the specific head life in one of the steps S62, S65, and S66, the first program 69 determines whether the determined specific head life is "1" (S67). In other words, in S67, it is determined whether the head life for the printer 14 identified by the read record is "1." When determining that the determined specific head life is "1" (S67: Yes), the first program 69 generates notification information (S68) representing that the head needs to be replaced or maintained. The notification information may include text information such as "The head needs to be replaced or maintained," "Please replace the head," "Please perform maintenance on the head," or "The head has only a short life left." Meanwhile, when determining that the determined specific battery life is not "1" (S67: No), the first program 69 stores the determined specific head life into memory 62 (S69).

Then, the first program 69 may transmit, to the administrator terminal 17, the notification information representing that the head needs to be replaced or maintained, instead of or together with the notification information representing that the battery 44 needs to be replaced (S46). In addition, the first program 69 may transmit the determined specific head life to the administrator terminal 17, instead of or together with the determined specific battery life (S46).

Operations and Advantageous Effects of First Modification

In the first modification, the first program 69 generates the notification information representing that the head needs to be replaced or maintained, based on usage information (e.g., the recording length and the number of recordings) regarding the use of the head. Thus, the first program 69 may cause the administrator to manage the heads that deteriorate with use.

In addition, the first program 69 transmits the generated notification information to the administrator terminal 17. Therefore, the first program 69 may make the administrator recognize that there is a need for replacement or maintenance of the head, when the head has only a short life left.

It is noted that the configurations, other than the configurations described in the aforementioned first modification and to be described in a below-mentioned second modification, are substantially the same as in the aforementioned illustrative embodiment.

Second Modification

In the aforementioned illustrative embodiment and the aforementioned first modification, examples have been described in which the first program 69 of the management server 11 performs the notification information generating process to generate the notification information representing that the battery 44 needs to be replaced and the notification information representing that the head needs to be replaced or maintained. However, the first program 69 may perform a notification information generating process as shown in FIG. 8B, instead of or together with the notification information generating process shown in FIG. 7B or FIG. 8A. The notification information generating process shown in FIG. 8B is a process to generate notification information representing that there is a need for replacement of the cutter of the print engine 45.

Specifically, the first program 69 of the management server 11 identifies, as a specific number of cutter using times, a registered value for "Number of Cutter Uses" in the read record (S71). Then, the first program 69 determines whether the specific number of cutter using times is equal to or more than a threshold previously stored in the memory 62 of the management server 11 (S72). Further, respective different thresholds for individual models may be stored in the memory 62.

When determining that the specific number of cutter using times is equal to or more than the threshold (S72: Yes), the first program 69 generates notification information (S73) representing that the cutter needs to be replaced. Meanwhile, when determining that the specific number of cutter using times is less than the threshold (S72: No), the first program 69 generates cutter life information (S74). For instance, the cutter life information may be a number expressed with five levels from "1" to "5." For instance, the cutter life information "5" represents that the remaining life of the cutter is long enough. Further, the cutter life information "1" represents that the cutter has only a short life left.

The first program 69 may transmit, to the administrator terminal 17, the notification information representing that the cutter needs to be replaced, instead of or together with the notification information representing that the battery 44 needs to be replaced (S46). In addition, the first program 69 may transmit the determined cutter life information to the administrator terminal 17, instead of or together with the determined specific battery life (S46).

Operations and Advantageous Effects of Second Modification

In the second modification, the first program 69 generates the notification information representing that the cutter needs to be replaced, based on the number of cutter uses.

Therefore, the first program 69 may cause the administrator to manage the cutters that deteriorate with use.

Further, the first program 69 transmits the generated notification information to the administrator terminal 17. Therefore, the first program 69 may make the administrator recognize that the cutter needs to be replaced, when the cutter has only a short life left.

In the aforementioned illustrative embodiment, an example has been described in which the first program 69 of the management server 11 performs the notification information generating process in response to receiving an HTTP request from the management terminal 17, and transmits an HTTP response including the generated notification information or the specific battery life. However, the management database is also stored in the memory 22 of the external intermediary device 12, and the external intermediary device 12 is a web server of which the URL is published on the Internet 15. That is, the second program 29 of the external intermediary device 12 may also perform substantially the same processes as the first program 69. The second program 29 of the external intermediary 12 may receive an HTTP request from the administrator terminal 17 via the communication I/F 23 in substantially the same manner as in S43. Then, the second program 29 may perform substantially the same notification information generating process as shown in FIG. 7B to generate notification information or to determine a specific battery life. Then, in substantially the same manner as in S46, the second program 29 may transmit the generated notification information or the determined specific battery life to the administrator terminal 17 via the communication I/F 23 and the Internet 15.

The second program 29 may transmit the second instruction command to the identified internal intermediary device 13, thereby inputting the third instruction command corresponding to the instruction from the administrator into each specified printer 14 via the corresponding internal intermediary device 13. That is, the second program 29 may cause the administrator to manage the printers 14 incapable of communicating directly with the management server 11 via the Internet 15. Further, when there is a need for replacement of the battery 44, the second program 29 may make the administrator aware of the notification information representing that the battery 44 needs to be replaced.

Fourth Modification

In the aforementioned illustrative embodiment, an example has been described in which the first program 69 of the management server 11 receives the HTTP request from the management terminal 17, performs the notification information generating process, and transmits the generated notification information and the HTTP response including the specific battery life to the management terminal 17. However, the third program 39 of each internal intermediary device 13 may receive a request from the administrator to perform the notification information generating process and display the generated notification information and the specific battery life on the display of each internal intermediary device 13.

Specifically, the memory 32 of each internal intermediary device 13 may store the management database shown in FIG. 3. Nonetheless, in this case, the management database stored by the memory 32 contains only the records of the printers 14 connected to the corresponding internal intermediary device 13 via the corresponding local network 16. In response to receiving the status information from the printers 14 connected via the corresponding local network 16 (S30), the third program 39 of each internal intermediary device 13 may register the received status information onto the management database stored in memory 32.

Figure 7B:
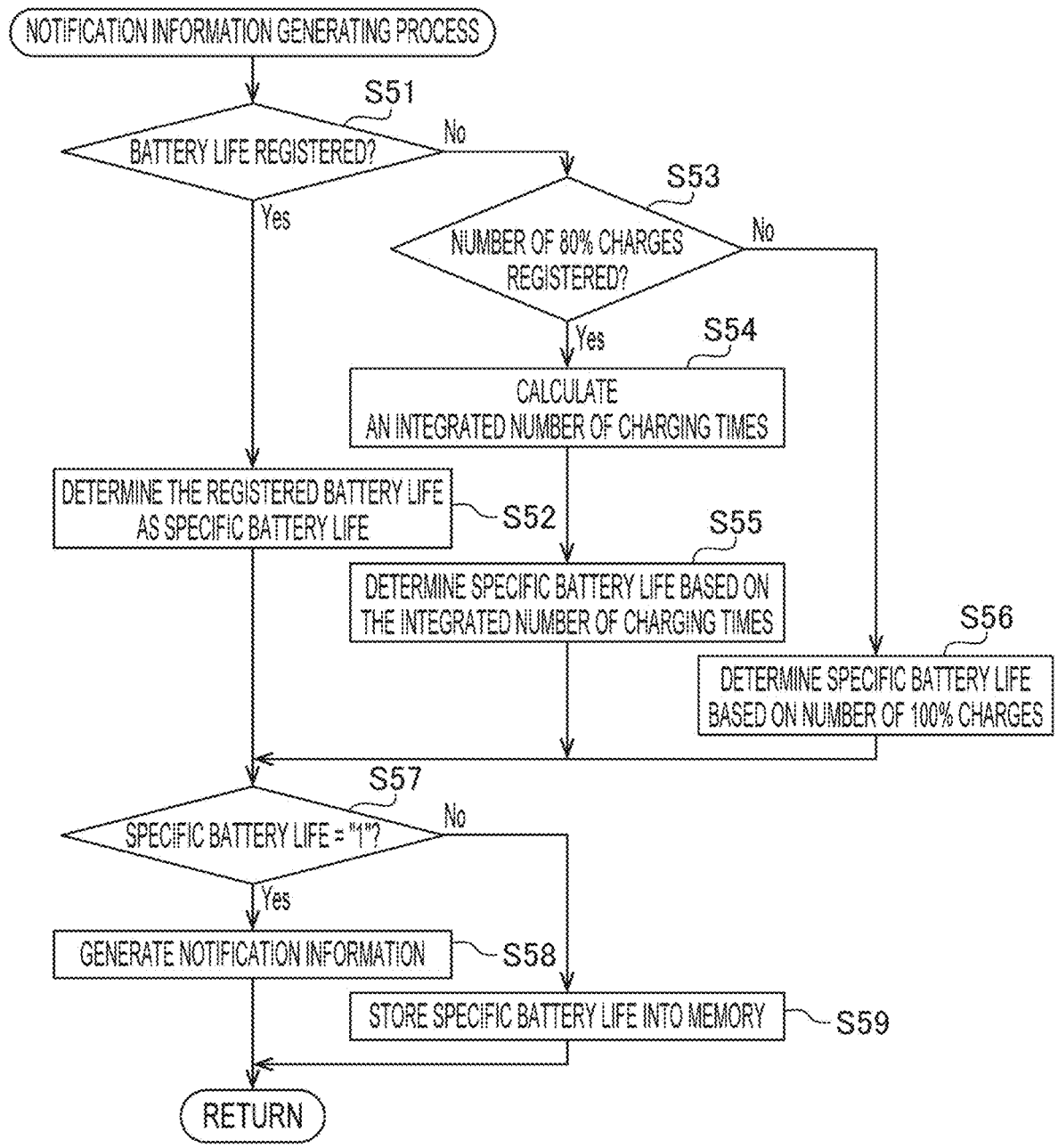
FIG. 7B is a flowchart showing a procedure of a notification information generating process by the management server, in the illustrative embodiment according to one or more aspects of the present disclosure.
Figure 8A:
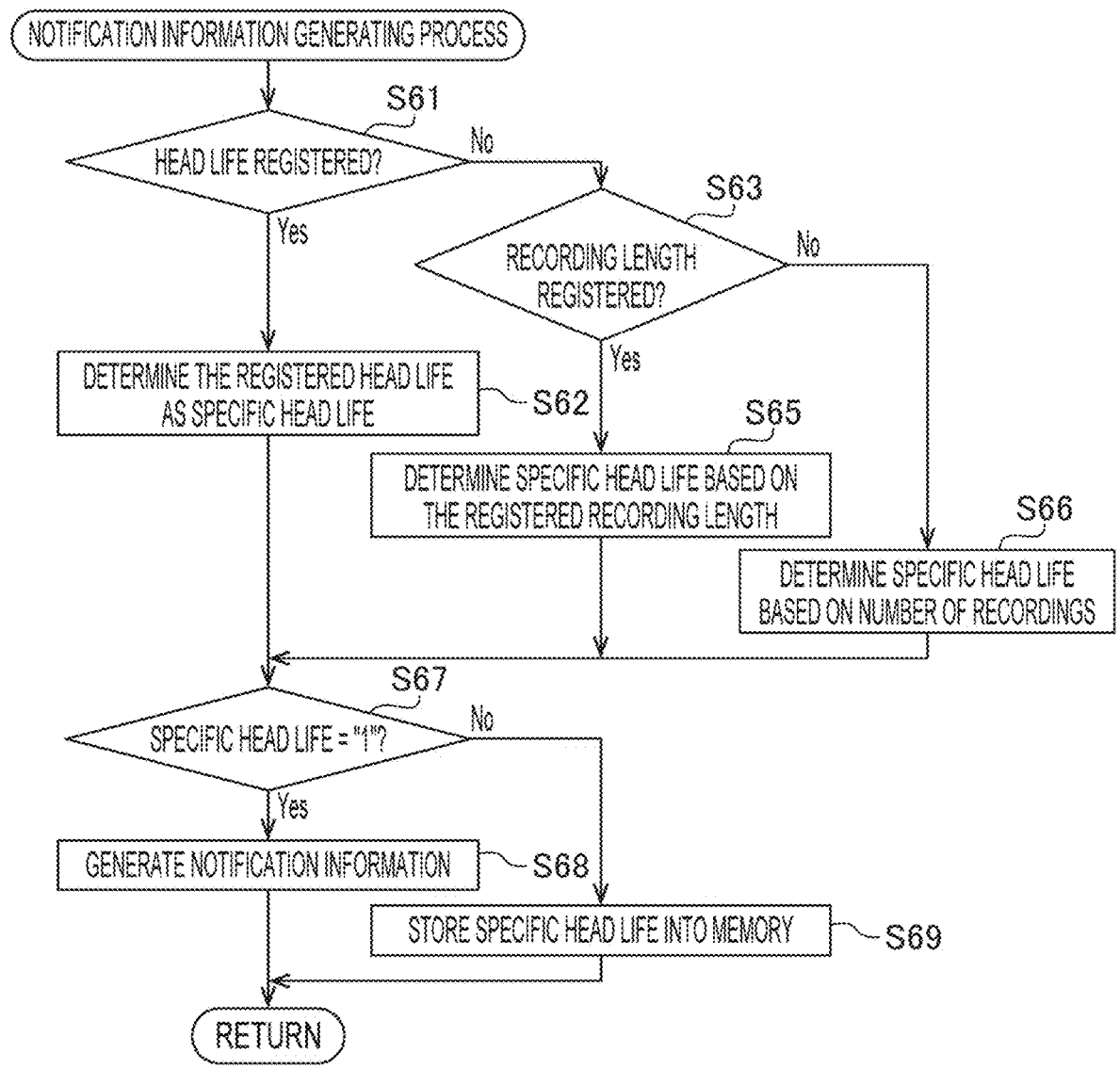
FIG. 8A is a flowchart showing a procedure of a notification information generating process in a first modification according to one or more aspects of the present disclosure.
Figure 8B:
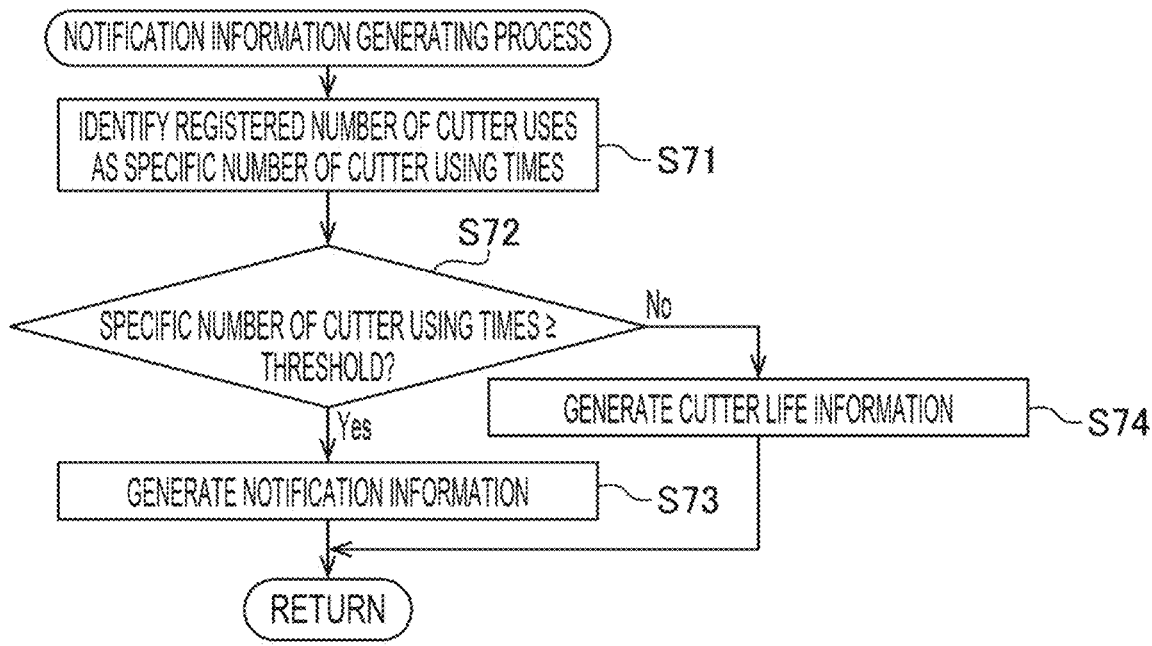
FIG. 8B is a flowchart showing a procedure of a notification information generating process in a second modification according to one or more aspects of the present disclosure.

When receiving a request to refer to the management database via a mouse or a keyboard connected to each internal intermediary device 13, the third program 39 of each internal intermediary device 13 may perform the notification information generating process shown in FIG. 7B to generate the notification information or to determine the specific battery life. The third program 39 may cause the display of the corresponding internal intermediary device 13 to display the generated notification information or the determined specific battery life. Thus, the third program 39 may make the administrator recognize the notification information or the specific battery life.

In notification information generating process shown in FIG. 7B, the third program 39 may generate the notification information representing that a battery 44 needs to be replaced, based on usage information (e.g., the number of 80% charges and the number of 100% charges) about the use of the battery 44. Thus, the third program 39 may cause the administrator to manage each battery 44 that deteriorates with use.

In addition, the third program 39 may display the generated notification information on the display. Thus, when a battery 44 has only a short life left, the third program 39 may make the administrator aware that the battery 44 needs to be replaced.

Fifth Modification

In the aforementioned illustrative embodiment, an example has been described in which the first program 69 of the management server 11 generates the notification information (S44) and transmits the generated notification information to the administrator terminal 17 (S46). Nonetheless, the second program 29 may generate the notification information, and the first program 69 may transmit the notification information to the administrator terminal 17.

Specifically, when receiving an HTTP request from the administrator terminal 17 (S43), the first program 69 of the management server 11 may transmit a command instructing execution of the notification information generating process to the external intermediary device 12 via the communication I/F 63 and the Internet 15. When the second program 29 of the external intermediary device 12 receives the command, the second program 29 may perform the notification information generating process shown in FIG. 7B to generate the notification information or to determine the specific battery life. Then, the second program 29 may transmit the generated notification information or the determined specific battery life to the management server 11 via the communication I/F 23 and the Internet 15. The first program 69 of the management server 11 may receive the notification information or the specific battery life from the external intermediary device 12 via the communication I/F 63. Then, the first program 69 may transmit an HTTP response or an e-mail including the received notification information and the received specific battery life via the communication I/F 63 and the Internet 15.

Sixth Modification

In the aforementioned illustrative embodiment, the example has been described in which the first program 69 of the management server 11 generates the notification information (S44) and transmits the generated notification information to the administrator terminal 17 (S46). Nonetheless, the third program 39 may generate the notification information, and the first program 69 may transmit the notification information to the administrator terminal 17.

Specifically, when receiving an HTTP request from the administrator terminal 17 (S43), the first program 69 of the management server 11 may transmit a command instructing execution of the notification information generating process to the external intermediary device 12 via the communication I/F 63 and the Internet 15. When the second program 29 of the external intermediary device 12 receives the command, the second program 29 may transmit an HTTP response including a command instructing execution of the notification information generating process to each internal intermediary device 13 via the communication I/F 23 and the Internet 15. When the third program 39 of each internal intermediary device 13 receives the command, the third program 39 may perform the notification information generating process shown in FIG. 7B to generate the notification information or to determine the specific battery life. It is noted that the memory 32 of each internal intermediary device 13 may store the management database described in the aforementioned fourth modification.

The third program 39 of each internal intermediary device 13 may transmit the generated notification information or the determined specific battery life to the external intermediary device 12 via the communication I/F 33 and the Internet 15. The second program 29 of the external intermediary device 12 may receive the notification information or the specific battery life from each internal intermediary device 13 via the communication I/F 33. Then, the second program 29 may transmit the received notification information or the received specific battery life to the management server 11 via the communication I/F 33 and the Internet 15. The first program 69 of the management server 11 may receive the notification information or the specific battery life from the external intermediary device 12. Then, the first program 69 may transmit an HTTP response or an e-mail including the received notification information or the received specified battery life via the communication I/F 63 and the Internet 15.

Other Modifications

In the aforementioned illustrative embodiment, an example has been described in which in response to receipt of the instruction from the administrator terminal 17 (S43), the first program 69 of the management server 11 performs the notification information generating process (S44), and determines the specific battery life based on at least one of the number of 80% charges and the number of 100% charges in the notification information generating process. However, the process of S53 to S56 in which the first program 69 determines the specific battery life based on at least one of the number of 80% charges and the number of 100% charges may be performed at other timings. For instance, in response to receiving the status information (S35), the first program 69 may perform substantially the same process as in the steps of S53 to S56 to determine the specific battery life based on at least one of the number of 80% charges and the number of 100% charges. Then, the first program 69 may register the determined specific battery life in the entry field for the item "Battery Life" of the management database. Thereafter, in the notification information generating process, the first program 69 may generate the notification information when the battery life registered on the management database is "1." In this case, the first program 69 may transmit, to the administrator terminal 17, not the first screen data but the third screen data having the battery life registered in each of all records, in response to a request from the administrator terminal 17.

In the aforementioned illustrative embodiment, an example has been described in which the first program 69 of the management server 11 transmits the HTTP response including the notification information or the determined specific battery life to the administrator terminal 17 (S46). However, the notification information or the specific battery life may be sent to the management terminal 17 via e-mail. Instead of or together with the process in S46, the first program 69 may transmit, to a mail server via the communication I/F 63 and the Internet 15, an e-mail that is addressed to the administrator terminal 17 and includes the notification information or the specific battery life. In this case, since the first program 69 transmits the notification information or the specific battery life via e-mail, the first program 69 may notify the administrator of the notification information or the specific battery life without having to receive an HTTP request from the administrator terminal 17. In other words, the first program 69 is allowed to provide the administrator with a notification that there exists a printer 14 associated with the battery life "1" earlier than when the notification is provided to the administrator via an HTTP response.

In the aforementioned illustrative embodiment, an example has been described in which when the determined specific battery life is not "1," the determined specific battery life is transmitted to the administrator terminal 17 (S59, S46). However, the determined specific battery life may not be transmitted to the administrator terminal 17.

The specific battery life determined in the notification information generating process may be registered in the entry field for the item "Battery Life" of the management database. In this case, the administrator may recognize the battery life of the battery 44 of each printer 14 with reference to the battery life registered on the management database.

In the aforementioned illustrative embodiment, an example has been described in which the determined specific battery life is transmitted to the administrator terminal 17 (S46). However, the first program 69 of the management server 11 may transmit the number of 80% charges and/or the number of 100% charges to the administrator terminal 17, instead of or together with the determined specific battery life. In this case, the administrator may estimate the battery life based on at least one of the number of 80% charges and the number of 100% charges.

In the aforementioned illustrative embodiment and modifications, examples have been described in which the notification information is information representing that there is a need for replacement of a member used in a printer 14 such as the battery 44, the head, or the cutter. However, for instance, when the printers 14 include a printer 14 of a particular model formed integrated with an unreplaceable head, the notification information may represent that the particular model of printer 14 itself needs to be replaced. In this case, the notification information may include text information such as "The printer needs to be replaced."

As described above, the management database is also stored in the memory 22 of the external intermediary device 12 that is a web server of which the URL is published on the Internet 15. Namely, the second program 29 of the external intermediary device 12 may perform substantially the same processes as performed by the first program 69. Therefore, for instance, when the external intermediary device 12 is configured to have substantially the same functions as the management server 11, the management server 11 may be omitted from the communication system 10. In another instance, when the management server 11 is configured to have substantially the same functions as the external intermediary device 12, the external intermediary device 12 may be omitted from the communication system 10.

The following shows examples of associations between elements exemplified in the aforementioned illustrative embodiment and modifications and elements according to aspects of the present disclosure. The communication system 10 may be an example of a "communication system" according to aspects of the present disclosure. The management server 11 may be an example of an "information processing device" according to aspects of the present disclosure. The CPU 61 may be an example of a "processor" according to aspects of the present disclosure. The CPU 61 and the memory 62 may be included in a "controller" according to aspects of the present disclosure. The communication I/F 63 may be an example of a "communication interface" according to aspects of the present disclosure. The first program 69 may be an example of "computer-readable program instructions" according to aspects of the present disclosure. The external intermediary device 12 and the internal intermediary devices 13 may be included in examples of an "intermediary device" according to aspects of the present disclosure, and may be included in examples of "at least one intermediary device" according to aspects of the present disclosure. In the aforementioned third modification, the external intermediary device 12 and the internal intermediary devices 13 may be included in examples of an "information processing device" according to aspects of the present disclosure. In this case, the second program 29 and the third program 39 may be included in examples of "computer-readable program instructions" according to aspects of the present disclosure. Further, in this case, the first instruction command may be an example of "first request information" according to aspects of the present disclosure. Further, in this case, the third instruction command may be an example of "second request information" according to aspects of the present disclosure. In the aforementioned fourth to sixth modifications, the external intermediary device 12 may be an example of a "first intermediary device" according to aspects of the present disclosure. Further, in this case, each internal intermediary device 13 may be an example of a "second intermediary device" according to aspects of the present disclosure. The label may be an example of a "sheet" according to aspects of the present disclosure. The battery 44 may be an example of a "particular member" according to aspects of the present disclosure. The number of 80% charges and the number of 100% charges may be included in examples of "usage information" according to aspects of the present disclosure. The battery life, the number of 80% charges, the number of 100% charges, the number of recordings, the recording length, and the number of cutter uses may be included in examples of "deterioration degree information" according to aspects of the present disclosure. The specific battery life, the specific number of cutter using times, and the cutter life information may be included in examples of "specific deterioration degree information" according to aspects of the present disclosure. The second screen data may be an example of "screen data" according to aspects of the present disclosure.

What is claimed is:

1. A non-transitory computer-readable medium storing computer-readable program instructions executable by a processor connected with an information processing device comprising a communication interface, wherein the non-transitory computer-readable medium, the processor, and the information processing device are external to a printer, the program instructions being configured to, when executed by the processor, cause the processor to:
   receive status information transmitted by the printer, via the communication interface, the status information including usage information regarding use of a rechargeable battery that deteriorates with use of the printer;
   determine, with the processor external to the printer, specific deterioration degree information indicating a deterioration degree of the rechargeable battery in a method relying on either deterioration degree information of the rechargeable battery or the usage information depending on whether or not the status information received from the printer includes the deterioration degree information of the rechargeable battery, wherein when the status information received from the printer includes the deterioration degree information, the processor external to the printer determines the deterioration degree information included in the status information as the specific deterioration degree information, whereas when the status information received from the printer does not include the deterioration degree information, the processor external to the printer determines the specific deterioration degree information based on the usage information included in the received status information, wherein the specific deterioration degree information is determined based on an integrated number of charging times of the rechargeable battery, and wherein the integrated number of charging times are calculated by integrating a number of 80% charges and a number of 100% charges;
   generate notification information when the determined specific deterioration degree information is equal to or more than a threshold stored in a memory of the information processing device, the notification information including at least one of information representing that the rechargeable battery needs to be replaced or maintained and information representing that the printer needs to be replaced; and
   transmit the generated notification information to a device other than the printer via the communication interface.

2. The non-transitory computer-readable medium according to claim 1,
   wherein the program instructions are further configured to, when executed, cause the processor to transmit the specific deterioration degree information via the communication interface.

3. The non-transitory computer-readable medium according to claim 2,
   wherein the program instructions are further configured to, when executed, cause the processor to send an e-mail including the deterioration degree information via the communication interface in the transmission of the specific deterioration degree information.

4. The non-transitory computer-readable medium according to claim 2,
   wherein the program instructions are further configured to, when executed, cause the processor to:
   when the status information received from the printer includes the deterioration degree information, transmit the specific deterioration degree information via the communication interface; and
   when the status information received from the printer does not include the deterioration degree information, transmit information corresponding to the usage information included in the status information.

5. The non-transitory computer-readable medium according to claim 1,
wherein the program instructions are further configured to, when executed, cause the processor to, in the transmission of the generated notification information, perform:
generating screen data including the notification information; and
in response to a request from an administrator terminal, transmitting a response including the generated screen data to the administrator terminal via the communication interface.

6. The non-transitory computer-readable medium according to claim 1,
wherein the printer is configured to communicate with the information processing device indirectly via an intermediary device, and
wherein the program instructions are further configured to, when executed, cause the processor to receive the status information transmitted by the printer, from the intermediary device via the communication interface.

7. The non-transitory computer-readable medium according to claim 1,
wherein the printer is configured to communicate with a management server indirectly via the information processing device, and
wherein the program instructions are further configured to, when executed, cause the processor to:
receive first request information from the management server via the communication interface; and
transmit second request information corresponding to the received first request information to the printer via the communication interface.

8. The non-transitory computer-readable medium according to claim 1,
wherein the program instructions are further configured to, when executed, cause the processor to transmit an e-mail including the notification information via the communication interface.

9. The non-transitory computer-readable medium according to claim 1, wherein
wherein the program instructions are further configured to, when executed, cause the processor to send an HTTP response via the communication interface in the transmission of the specific deterioration degree information.

10. A non-transitory computer-readable medium storing computer-readable program instructions executable by a processor of a first intermediary device of a communication system, the communication system comprising the first intermediary device and a second intermediary device, wherein the non-transitory computer-readable medium, the processor, and the first intermediary device are external to a printer, the program instructions being configured to, when executed by the processor, cause the processor to:
receive an HTTP request including status information of the printer, from the second intermediary device via a communication interface of the first intermediary device, the status information including usage information regarding use of a rechargeable battery that deteriorates with use of the printer;
determine, with the processor external to the printer, specific deterioration degree information indicating a deterioration degree of the rechargeable battery in a method relying on either deterioration degree information of the rechargeable battery or the usage information depending on whether or not the status information received from the printer includes the deterioration degree information of the rechargeable battery, wherein when the status information received from the printer includes the deterioration degree information, the processor external to the printer determines the deterioration degree information included in the status information as the specific deterioration degree information, whereas when the status information received from the printer does not include the deterioration degree information, the processor external to the printer determines the specific deterioration degree information based on the usage information included in the received status information, wherein the specific deterioration degree information is determined based on an integrated number of charging times of the rechargeable battery, and wherein the integrated number of charging times are calculated by integrating a number of 80% charges and a number of 100% charges;
generate notification information when the determined specific deterioration degree information is equal to or more than a threshold stored in a memory of the information processing device, the notification information including at least one of information representing that rechargeable battery needs to be replaced or maintained and information representing that the printer needs to be replaced; and
transmit the generated notification information to a device other than the printer via the communication interface.

11. A non-transitory computer-readable medium storing computer-readable program instructions executable by a processor of a second intermediary device of a communication system, the communication system comprising a first intermediary device and the second intermediary device, wherein the non-transitory computer-readable medium, the processor, and the second intermediary device are external to a printer, the program instructions being configured to, when executed by the processor, cause the processor to:
transmit a request for transmission of status information to the printer via a communication interface of the second intermediary device, the status information including usage information regarding use of a rechargeable battery that deteriorates with use of the printer;
receive the status information transmitted by the printer, via the communication interface;
transmit an HTTP request including the received status information to the first intermediary device via the communication interface;
determine, with the processor external to the printer, specific deterioration degree information indicating a deterioration degree of the rechargeable battery in a method relying on either deterioration degree information of the rechargeable battery or the usage information differing depending on whether or not the status information received from the printer includes the deterioration degree information of the rechargeable battery, wherein when the status information received from the printer includes the deterioration degree information, the processor external to the printer determines the deterioration degree information included in the status information as the specific deterioration degree information, whereas when the status information received from the printer does not include the deterioration degree information, the processor external to the printer determines the specific deterioration degree information based on the usage information included in the received status information, wherein the specific deterioration degree information is determined based on an integrated number of charging times of the rechargeable battery, and wherein the integrated number of charging times are calculated by integrating a number of 80% charges and a number of 100% charges;
generate notification information when the determined specific deterioration degree information is equal to or more than a threshold stored in a memory of the information processing device, the notification information including at least one of information representing that the rechargeable battery needs to be replaced or maintained and information representing that the printer needs to be replaced; and
output the generated notification information.

12. An information processing device comprising:
a communication interface;
a processor; and
a memory, wherein the memory, the processor, and the communication interface are external to a printer, and wherein the memory stores computer-readable instructions configured to, when executed by the processor, cause the processor to:
  receive status information transmitted by the printer, via the communication interface, the status information including usage information regarding use of a rechargeable battery that deteriorates with use of the printer;
  determine, with the processor external to the printer, specific deterioration degree information indicating a deterioration degree of the rechargeable battery in a method relying on either deterioration degree information of the rechargeable battery or the usage information depending on whether or not the status information received from the printer includes the deterioration degree information of the rechargeable battery, wherein when the status information received from the printer includes the deterioration degree information, the processor external to the printer determines the deterioration degree information included in the status information as the specific deterioration degree information, whereas when the status information received from the printer does not include the deterioration degree information, the processor external to the printer determines the specific deterioration degree information based on the usage information included in the received status information, wherein the specific deterioration degree information is determined based on an integrated number of charging times of the rechargeable battery, and wherein the integrated number of charging times are calculated by integrating a number of 80% charges and a number of 100% charges;
  generate notification information when the determined specific deterioration degree information is equal to or more than a threshold stored in the memory of the information processing device, the notification information including at least one of information representing that the rechargeable battery needs to be replaced or maintained and information representing that the printer needs to be replaced; and
  transmit the generated notification information to a device other than the printer via the communication interface.

13. A communication system comprising:
a management server; and
an intermediary device,
wherein the management server comprises:
  a first communication interface; and
  a first controller,
wherein the intermediary device comprises:
  a second communication interface; and
  a second controller, wherein the intermediary device is external to a printer, the second controller configured to:
    transmit a request for transmission of status information to the printer via the second communication interface, the status information including usage information regarding use of a rechargeable battery that deteriorates with use of the printer;
    receive the status information transmitted by the printer, via the second communication interface; and
    transmit the received status information to the management server via the second communication interface, and
wherein the first controller is configured to:
  receive the status information via the first communication interface;
  determine, with the first controller, specific deterioration degree information indicating a deterioration degree of the rechargeable battery in a method relying on either deterioration degree information of the rechargeable battery or the usage information depending on whether or not the status information received from the printer includes the deterioration degree information of the rechargeable battery, wherein when the status information received from the printer includes the deterioration degree information, the processor external to the printer determines the deterioration degree information included in the status information as the specific deterioration degree information, whereas when the status information received from the printer does not include the deterioration degree information, the processor external to the printer determines the specific deterioration degree information based on the usage information included in the received status information, wherein the specific deterioration degree information is determined based on an integrated number of charging times of the rechargeable battery, and wherein the integrated number of charging times are calculated by integrating a number of 80% charges and a number of 100% charges;
  generate notification information when the determined specific deterioration degree information is equal to or more than a threshold stored in a memory of the information processing device, the notification information including at least one of information representing that the rechargeable battery needs to be replaced or maintained and information representing that the printer needs to be replaced; and
  transmit the generated notification information to a device other than the printer via the first communication interface.

14. A communication system comprising:
a management server; and
at least one intermediary device comprising:
  at least one communication interface; and
  at least one controller, wherein the at least one intermediary device is external to a printer, the at least one controller configured to:

transmit a request for transmission of status information to the printer via the at least one communication interface, the status information including usage information regarding use of a rechargeable battery that deteriorates with use of the printer;

receive the status information transmitted by the printer, via the at least one communication interface;

determine, with the at least one controller, specific deterioration degree information indicating a deterioration degree of the rechargeable battery in a method relying on either deterioration degree information of the rechargeable battery or the usage information depending on whether or not the status information received from the printer includes the deterioration degree information of the rechargeable battery, wherein when the status information received from the printer includes the deterioration degree information, the processor external to the printer determines the deterioration degree information included in the status information as the specific deterioration degree information, whereas when the status information received from the printer does not include the deterioration degree information, the processor external to the printer determines the specific deterioration degree information based on the usage information included in the received status information, wherein the specific deterioration degree information is determined based on an integrated number of charging times of the rechargeable battery, and wherein the integrated number of charging times are calculated by integrating a number of 80% charges and a number of 100% charges;

generate notification when the determined specific deterioration degree information is equal to or more than a threshold stored in a memory of the information processing device, the notification information including at least one of information representing that the rechargeable battery needs to be replaced or maintained and information representing that the printer needs to be replaced; and transmit the generated notification information to the management server via the at least one communication interface.

15. The communication system according to claim 14, wherein the at least one intermediary device comprises:
a first intermediary device; and
a second intermediary device,
wherein the first intermediary device comprises:
a first communication interface included in the at least one communication interface, the first communication interface being connected with an Internet; and
a first controller included in the at least one controller,
wherein the second intermediary device comprises:
a second communication interface included in the at least one communication interface, the second communication interface being connected with the printer via a communication network connected with the Internet via a gateway device; and a second controller included in the at least one controller, the second controller being configured to:
transmit the request for transmission of the status information to the printer via the second communication interface;
receive the status information transmitted by the printer, via the second communication interface; and
transmit an HTTP request including the status information received from the printer to the first intermediary device via the second communication interface, and
wherein the first controller is configured to:
receive the HTTP request including the status information from the second intermediary device via the first communication interface; and
transmit the notification information to the management server via the first communication interface.

16. A method implementable on a processor connected with an information processing device comprising a communication interface, wherein the processor and the information processing device are external to a printer, the method comprising:
receiving status information transmitted by the printer, via the communication interface, the status information including usage information regarding use of a rechargeable battery that deteriorates with use of the printer;
determine, with the processor external to the printer, specific deterioration degree information indicating a deterioration degree of the rechargeable battery in a method relying on either deterioration degree information of the rechargeable battery or the usage information depending on whether or not the status information received from the printer includes the deterioration degree information of the rechargeable battery, wherein when the status information received from the printer includes the deterioration degree information, the processor external to the printer determines the deterioration degree information included in the status information as the specific deterioration degree information, whereas when the status information received from the printer does not include the deterioration degree information, the processor external to the printer determines the specific deterioration degree information based on the usage information included in the received status information, wherein the specific deterioration degree information is determined based on an integrated number of charging times of the rechargeable battery, and wherein the integrated number of charging times are calculated by integrating a number of 80% charges and a number of 100% charges;
generating notification information when the determined specific deterioration degree information is equal to or more than a threshold stored in a memory of the information processing device, the notification information including at least one of information representing that the rechargeable battery needs to be replaced or maintained and information representing that the printer needs to be replaced; and
outputting the generated notification information.

* * * * *

UNITED STATES PATENT AND TRADEMARK OFFICE
CERTIFICATE OF CORRECTION

PATENT NO. : 11,461,060 B2
APPLICATION NO. : 16/891526
DATED : October 4, 2022
INVENTOR(S) : Naoto Shiraga It is certified that error appears in the above-identified patent and that said Letters Patent is hereby corrected as shown below:

In the Claims

Column 34, Claim 16, Line 29 should read:
determining, with the processor external to the printer, Signed and Sealed this
Fourth Day of July, 2023

Katherine Kelly Vidal
*Director of the United States Patent and Trademark Office*